US010195797B2

(12) United States Patent
Williams et al.

(10) Patent No.: US 10,195,797 B2
(45) Date of Patent: Feb. 5, 2019

(54) CARTRIDGE-BASED DISPENSING OF NANOSTRUCTURE FILMS

(71) Applicant: N12 Technologies, Inc., Cambridge, MA (US)

(72) Inventors: Ryan D. Williams, Somerville, MA (US); David A. Degtiarov, Newton, MA (US)

(73) Assignee: N12 TECHNOLOGIES, INC., Cambridge, MA (US)

( * ) Notice: Subject to any disclaimer, the term of this patent is extended or adjusted under 35 U.S.C. 154(b) by 0 days.

(21) Appl. No.: 14/770,987

(22) PCT Filed: Feb. 28, 2014

(86) PCT No.: PCT/US2014/019503
§ 371 (c)(1),
(2) Date: Aug. 27, 2015

(87) PCT Pub. No.: WO2014/134484
PCT Pub. Date: Sep. 4, 2014

(65) Prior Publication Data
US 2015/0360424 A1   Dec. 17, 2015

Related U.S. Application Data

(60) Provisional application No. 61/771,072, filed on Feb. 28, 2013.

(51) Int. Cl.
*B29C 70/38* (2006.01)
*B05C 1/00* (2006.01)
(Continued)

(52) U.S. Cl.
CPC .............. *B29C 70/386* (2013.01); *B05C 1/00* (2013.01); *B29C 70/388* (2013.01); *B65H 18/28* (2013.01);
(Continued)

(58) Field of Classification Search
CPC . B05C 1/00; B23P 5/00; B29C 70/386; B29C 70/388; B65H 18/28;
(Continued)

(56) References Cited

U.S. PATENT DOCUMENTS 3,574,076 A   4/1971   Kirsch
3,580,731 A   5/1971   Milewski et al.
(Continued)

FOREIGN PATENT DOCUMENTS

CN   102263221   11/2011
EP   1489630   12/2004
(Continued)

OTHER PUBLICATIONS

International Search Report and Written Opinion, dated Jun. 10, 2014, Shane Thomas, ISA/US.
(Continued)

*Primary Examiner* — George R Koch
(74) *Attorney, Agent, or Firm* — West Hill Technology Counsel

(57) ABSTRACT

The present disclosure provides systems and methods for storing and dispensing nanostructure material that can maintain the morphology of the nanostructures. The nanostructures are disposed on a flexible substrate that is spooled into a roll. The substrate can be provided with raised edges that space adjacent portions from each other in the roll to protect the nanostructures from damage or misalignment. The roll can be provided to a cassette that can be sealed to protect the nanostructure material from exposure to unwanted environments and to protect individuals from exposure to the nanostructure material. The substrate can be unrolled in the cassette to permit the nanostructure material to be applied to an item outside the cassette while maintaining the morphology of the nanostructures. Various controls can be provided (Continued)

to unroll the substrate and deposit the nanostructure material with high precision and repeatability.

28 Claims, 3 Drawing Sheets

(51) Int. Cl.
    *B65H 18/28*     (2006.01)
    *C01B 32/164*     (2017.01)

(52) U.S. Cl.
    CPC ...... *C01B 32/164* (2017.08); *B65H 2701/377* (2013.01); *Y10T 156/16* (2015.01); *Y10T 156/17* (2015.01)

(58) Field of Classification Search
    CPC ............ B65H 2701/377; C01B 31/024; Y10T 156/16; Y10T 156/17
    USPC ........................................................ 156/64
    See application file for complete search history.

(56) References Cited

U.S. PATENT DOCUMENTS

| | | |
|---|---|---|
| 4,149,866 A | 4/1979 | Austin et al. |
| 4,199,336 A | 4/1980 | Rittler |
| 4,307,148 A | 12/1981 | LeBlanc |
| 4,560,603 A | 12/1985 | Giacomel |
| 4,560,606 A | 12/1985 | Rapp et al. |
| 4,770,926 A | 9/1988 | Yamamura et al. |
| 4,892,693 A | 1/1990 | Perrotta et al. |
| 5,149,584 A | 9/1992 | Baker et al. |
| 5,540,126 A | 7/1996 | Piramoon |
| 5,580,502 A | 12/1996 | Forster et al. |
| 5,648,109 A | 7/1997 | Gutowski et al. |
| 5,847,283 A | 12/1998 | Finot et al. |
| 5,954,917 A * | 9/1999 | Jackson ............... B29C 70/342 156/433 |
| 6,045,769 A | 4/2000 | Kambe et al. |
| 6,155,514 A * | 12/2000 | Hailey .................. B65H 19/12 242/422.4 |
| 6,265,333 B1 | 7/2001 | Dzenis et al. |
| 6,331,690 B1 | 12/2001 | Yudasaka et al. |
| 6,420,293 B1 | 7/2002 | Chang et al. |
| 6,495,258 B1 | 12/2002 | Chen et al. |
| 7,001,857 B2 | 2/2006 | Degroote |
| 7,014,737 B2 | 3/2006 | Harutyunyan et al. |
| 7,052,668 B2 | 5/2006 | Smalley et al. |
| 7,060,241 B2 | 6/2006 | Glatkowski |
| 7,132,161 B2 | 11/2006 | Knowles et al. |
| 7,160,531 B1 | 1/2007 | Jacques et al. |
| 7,323,157 B2 | 1/2008 | Kinloch et al. |
| 7,384,663 B2 | 6/2008 | Olry et al. |
| 7,459,013 B2 | 12/2008 | Holmes et al. |
| 7,537,825 B1 | 5/2009 | Wardle et al. |
| 7,687,146 B1 | 3/2010 | Freitas et al. |
| 7,727,624 B2 | 6/2010 | Cao et al. |
| 7,754,054 B2 | 7/2010 | Mitra et al. |
| 7,884,525 B2 | 2/2011 | Culpepper et al. |
| 8,130,007 B2 | 3/2012 | Eldridge et al. |
| 8,171,568 B2 | 5/2012 | Freitas et al. |
| 8,257,678 B2 | 9/2012 | Steiner, III et al. |
| 8,318,386 B2 | 11/2012 | Korbin |
| 8,337,979 B2 | 12/2012 | Wardle et al. |
| 8,376,013 B2 | 2/2013 | Bourke et al. |
| 8,388,795 B2 | 3/2013 | Tsotsis et al. |
| 8,545,791 B2 | 10/2013 | Plata et al. |
| 8,638,113 B2 | 1/2014 | Crafts et al. |
| 8,865,109 B2 | 10/2014 | Steiner, III et al. |
| 8,987,707 B2 | 3/2015 | Arnold et al. |
| 9,181,639 B2 | 11/2015 | Hart et al. |
| 9,394,175 B2 | 7/2016 | Hart et al. |
| 9,478,610 B2 | 10/2016 | Hart et al. |
| 9,663,368 B2 | 5/2017 | Guzman de Villoria et al. |
| 2002/0102203 A1 | 8/2002 | Smalley et al. |
| 2002/0113335 A1 | 8/2002 | Lobovsky et al. |
| 2003/0012721 A1 | 1/2003 | Nakayama et al. |
| 2003/0143453 A1 | 7/2003 | Ren et al. |
| 2003/0203205 A1 | 10/2003 | Bi et al. |
| 2003/0231471 A1 | 12/2003 | De Lorenzo et al. |
| 2003/0236588 A1 | 12/2003 | Jang et al. |
| 2004/0053780 A1 | 3/2004 | Jiang et al. |
| 2004/0071870 A1 | 4/2004 | Knowles et al. |
| 2004/0099438 A1 | 5/2004 | Arthur et al. |
| 2004/0105807 A1 | 6/2004 | Fan et al. |
| 2004/0222081 A1 | 11/2004 | Tour et al. |
| 2004/0235376 A1 | 11/2004 | Byma et al. |
| 2004/0250950 A1 | 12/2004 | Dubrow |
| 2005/0025696 A1 | 2/2005 | Resasco et al. |
| 2005/0066883 A1 | 3/2005 | Dubrow et al. |
| 2005/0081983 A1 | 4/2005 | Nakayama et al. |
| 2005/0095938 A1 | 5/2005 | Rosenberger et al. |
| 2005/0116336 A1 | 6/2005 | Chopra et al. |
| 2005/0130341 A1 | 6/2005 | Furukawa et al. |
| 2005/0152826 A1 | 7/2005 | Shatwell |
| 2005/0167647 A1 | 8/2005 | Huang et al. |
| 2005/0170089 A1 | 8/2005 | Lashmore et al. |
| 2005/0176329 A1 | 8/2005 | Olry et al. |
| 2005/0215049 A1 | 9/2005 | Horibe et al. |
| 2005/0224220 A1 | 10/2005 | Li et al. |
| 2005/0260119 A1 | 11/2005 | Sunkara et al. |
| 2006/0018018 A1 | 1/2006 | Nomura et al. |
| 2006/0025304 A1 | 2/2006 | Wang et al. |
| 2006/0062944 A1 | 3/2006 | Gardner et al. |
| 2006/0073089 A1 | 4/2006 | Ajayan et al. |
| 2006/0166003 A1 | 7/2006 | Khabashesku et al. |
| 2006/0237301 A1 | 10/2006 | Azami et al. |
| 2006/0240238 A1 | 10/2006 | Boussaad et al. |
| 2006/0241237 A1 | 10/2006 | Drzal et al. |
| 2006/0252853 A1 | 11/2006 | Ajayan et al. |
| 2006/0260751 A1 * | 11/2006 | Lauder .................. B29C 70/388 156/382 |
| 2006/0270790 A1 | 11/2006 | Comeau |
| 2007/0042903 A1 | 2/2007 | Huang et al. |
| 2007/0090489 A1 | 4/2007 | Hart et al. |
| 2007/0092431 A1 | 4/2007 | Resasco et al. |
| 2007/0128960 A1 | 6/2007 | Nejhad et al. |
| 2007/0163702 A1 | 7/2007 | Sullivan |
| 2007/0218202 A1 | 9/2007 | Ajayan et al. |
| 2007/0258881 A1 | 11/2007 | Kambara et al. |
| 2008/0018012 A1 | 1/2008 | Lemaire et al. |
| 2008/0075954 A1 | 3/2008 | Wardle et al. |
| 2008/0154431 A1 | 6/2008 | Defries et al. |
| 2008/0160856 A1 | 7/2008 | Chen et al. |
| 2008/0170982 A1 | 7/2008 | Zhang et al. |
| 2008/0187648 A1 | 8/2008 | Hart et al. |
| 2008/0210542 A1 | 9/2008 | Maekawa et al. |
| 2008/0241047 A1 | 10/2008 | Asano |
| 2008/0286564 A1 | 11/2008 | Tsotsis et al. |
| 2009/0008610 A1 | 1/2009 | Bordere et al. |
| 2009/0056802 A1 | 3/2009 | Rabani |
| 2009/0075157 A1 | 3/2009 | Pak et al. |
| 2009/0117363 A1 | 5/2009 | Wardle et al. |
| 2009/0196993 A1 | 8/2009 | Iijima et al. |
| 2009/0282802 A1 | 11/2009 | Cooper et al. |
| 2009/0291352 A1 | 11/2009 | Oshihara et al. |
| 2009/0311166 A1 | 12/2009 | Hart et al. |
| 2010/0192851 A1 | 8/2010 | Shah et al. |
| 2010/0196695 A1 | 8/2010 | Garcia et al. |
| 2010/0206803 A1 | 8/2010 | Ward et al. |
| 2010/0255303 A1 | 10/2010 | Wardle et al. |
| 2010/0266964 A1 | 10/2010 | Gilje |
| 2010/0276072 A1 | 11/2010 | Shah et al. |
| 2010/0279569 A1 | 11/2010 | Shah et al. |
| 2011/0027162 A1 | 2/2011 | Steiner, III et al. |
| 2011/0111577 A1 | 5/2011 | Choi et al. |
| 2011/0142091 A1 | 6/2011 | Wardle et al. |
| 2011/0159270 A9 | 6/2011 | Davis et al. |
| 2011/0162957 A1 | 7/2011 | Wardle et al. |
| 2012/0014854 A1 | 1/2012 | Fehrmann et al. |
| 2012/0088056 A1 * | 4/2012 | Hallander ............... B29C 70/30 428/54 |
| 2012/0135224 A1 | 5/2012 | Guzman de Villoria et al. |

(56) References Cited

U.S. PATENT DOCUMENTS

| | | | |
|---|---|---|---|
| 2012/0164903 A1 | 6/2012 | Wardle et al. |
| 2012/0251432 A1 | 10/2012 | Cooper |
| 2012/0282453 A1 | 11/2012 | Wang et al. |
| 2013/0058859 A1 | 3/2013 | Steiner, III et al. |
| 2013/0072077 A1 | 3/2013 | Steiner, III et al. |
| 2013/0142987 A1 | 6/2013 | Wardle et al. |
| 2014/0127490 A1 | 5/2014 | Islam et al. |
| 2014/0154412 A1 | 6/2014 | Malecki et al. |
| 2014/0186547 A1 | 7/2014 | Wu et al. |
| 2014/0295166 A1 | 10/2014 | Steiner, III et al. |
| 2015/0053927 A1 | 2/2015 | Arnold et al. |
| 2015/0071849 A1 | 3/2015 | Steiner, III et al. |
| 2016/0083256 A1 | 3/2016 | Hart et al. |
| 2017/0057823 A1 | 2/2017 | Hart et al. |
| 2017/0341316 A1 | 11/2017 | Wardle et al. |

FOREIGN PATENT DOCUMENTS

| | | |
|---|---|---|
| EP | 1637828 | 3/2006 |
| EP | 1652573 | 8/2010 |
| FR | 2864739 | 8/2005 |
| FR | 2865739 | 6/2006 |
| JP | S50-119071 | 9/1975 |
| JP | S63093374 A | 1/1988 |
| JP | S63097257 A | 4/1988 |
| JP | H02017964 A | 1/1990 |
| JP | H02147270 U | 12/1990 |
| JP | H08133716 | 5/1996 |
| JP | 2000-172202 | 6/2000 |
| JP | 2001-291465 | 10/2001 |
| JP | 2002-121015 | 4/2002 |
| JP | 2002-141633 | 5/2002 |
| JP | 2002-206169 | 7/2002 |
| JP | 2002293518 | 10/2002 |
| JP | 2003-500325 | 1/2003 |
| JP | 2003-119295 | 4/2003 |
| JP | 2003-171108 | 6/2003 |
| JP | 2003-249166 | 9/2003 |
| JP | 2003286017 A | 10/2003 |
| JP | 2004-55158 | 2/2004 |
| JP | 2004-103403 | 4/2004 |
| JP | 2004-268192 | 9/2004 |
| JP | 2004-324004 | 11/2004 |
| JP | 2004324004 | 11/2004 |
| JP | 17-022141 | 1/2005 |
| JP | 2005-007861 | 1/2005 |
| JP | 2005-22141 | 1/2005 |
| JP | 2005-068000 | 3/2005 |
| JP | 2005-078880 | 3/2005 |
| JP | 2005-170787 | 6/2005 |
| JP | 2005200676 | 7/2005 |
| JP | 2005-256222 | 9/2005 |
| JP | 2005-279624 | 10/2005 |
| JP | 2005-285821 | 10/2005 |
| JP | 2005-302305 | 10/2005 |
| JP | 2006-008473 | 1/2006 |
| JP | 2006-011296 | 1/2006 |
| JP | 2001080912 | 1/2006 |
| JP | 2006-095429 | 4/2006 |
| JP | 2006-206169 | 8/2006 |
| JP | 2006-228818 | 8/2006 |
| JP | 2006-231247 | 9/2006 |
| JP | 2006-295120 | 10/2006 |
| JP | 2007-515364 | 6/2007 |
| JP | 2004-030926 | 8/2007 |
| JP | 2007-523033 | 8/2007 |
| JP | 2008-044099 | 2/2008 |
| JP | 2008-133716 | 6/2008 |
| JP | 2009-511086 | 3/2009 |
| JP | 2009-517531 | 4/2009 |
| JP | 2009-537339 | 10/2009 |
| JP | 2009-537439 | 10/2009 |
| JP | 2009-538809 | 11/2009 |
| JP | 2010-504268 | 2/2010 |
| JP | 4883841 | 2/2012 |
| JP | 201208716 A | 5/2012 |
| JP | 2005-538026 | 12/2015 |
| WO | 1999062705 | 12/1999 |
| WO | 2001094260 | 12/2001 |
| WO | 2003049219 | 6/2003 |
| WO | 2003069019 | 8/2003 |
| WO | 2003093174 | 11/2003 |
| WO | 2004025003 | 3/2004 |
| WO | 2004094303 | 11/2004 |
| WO | 2005028549 | 8/2005 |
| WO | 2005044723 | 9/2005 |
| WO | 2005075341 | 12/2005 |
| WO | 2006096964 | 9/2006 |
| WO | 2006120803 | 11/2006 |
| WO | 2006135375 | 12/2006 |
| WO | 2007088829 | 8/2007 |
| WO | 2007116706 | 10/2007 |
| WO | 2007055744 | 11/2007 |
| WO | 2007139038 | 12/2007 |
| WO | 2007136755 | 1/2008 |
| WO | 2008034204 | 3/2008 |
| WO | 2008057620 | 5/2008 |
| WO | 2008100325 | 8/2008 |
| WO | 2008054409 | 10/2008 |
| WO | 2008054541 | 3/2009 |
| WO | 2009029218 | 9/2009 |
| WO | 2010120273 | 10/2010 |
| WO | 2011014258 | 2/2011 |
| WO | WO 2011/106109 A2 | 9/2011 |
| WO | WO2011106109 | 9/2011 |
| WO | 2012074367 | 6/2012 |
| WO | 2012091789 | 7/2012 |
| WO | 2014197078 | 12/2014 |

OTHER PUBLICATIONS

European Patent Office (EPO) Supplementary European Search Report for Application No. EP14756860.4 dated Jul. 27, 2016 (4 Pages).

European Patent Office (EPO) Supplementary European Search Opinion for Application No. EP14756860.4 dated Jul. 27, 2016 (3 Pages).

Huh et al., "Control of carbon nanotube growth using cobalt nanoparticles as catalyst," Applied Surface Science, Elsevier, vol. 249 (2005): 145-150.

European Decision to Refuse for Application No. 7795034.3 dated Mar. 28, 2013.

Invitation to Pay Additional Fees dated Dec. 10, 2008 in connection with PCT/US2007/011913.

International Preliminary Report on Patentability dated Mar. 4, 2010 in PCT/US2008/009996.

Blanco et al., "Limiting Mechanisms of Mode 1 Interlaminar Toughening of Composites Reinforced with Aligned Carbon Nanotubes," J. Comp. Mater. 2009; 43(8) 825-41.

Fan et al., (Carbon Nanotubes Arrays on Silicon Substrates and Their Possible Application; Physica E; vol. 8, Issue 2: 179-183; 2000).

Official Communication from corresponding European Patent Application No. 07 867 126.0, dated Dec. 22, 2009.

Official Communication from corresponding European Patent Application No. 07 867 126.0, dated Jul. 21, 2011.

Rummeli, et al., "On the Graphitization Nature of Oxides for the Formation of Carbon Nanostructures," Including Supporting Information, Chemistry of Materials, 19:4105-4107 (2007).

Fan et al. "Self-Oriented Regular Arrays Carbon Nanotubes and Their Field Emission Properties". Science vol. 203. Jan. 1999.

Vander Wal et al., "Comparative flame and furnace synthesis of single-walled carbon nanotubes," Chemical Physics Letters, vol. 336, Issues 1-2, Mar. 9, 2001, pp. 24-32, ISSN 0009-2614, 10.1016/S0009-2614(01)00114-2. (http://www.sciencedirect.com/science/article/pii/S0009261401001142).

Jung et al., "Synthesis of carbon nanotubes grown by hot filament plasma-enhanced chemical vapor deposition method," Diamond and Related Materials, vol. 13, Issue 2, Feb. 2004, pp. 299-304,

(56) References Cited

OTHER PUBLICATIONS

ISSN 0925-9635, 10.1016/j.diamond.2003.11.056. (http://www.sciencedirect.com/science/article/pii/S0925963503005466).
International Search Report and Written Opinion, dated Jan. 24, 2011 in PCT/US2010/002135.
Bachilo, et al., "Narrow (n,m)-Distribution of Single-Walled Carbon Nanotubes Grown Using a Solid Support Catalyst," Journal of the American Chemical Society, 125:11186-11187 (2003).
Balaceanu, et al., "Surface Chemistry of Plasma Deposited ZrC Hard Coatings," Journal of Optoelectronics and Advanced Materials, 7, 2557-2560 (2005).
Barr, "An ESCA Study of the Termination of the Passivation of Elemental Metals," Journal of Physical Chemistry, 82:1801-1810 (1978).
Baumann, et al., "Synthesis and Characterization of Copper-Doped Carbon Aerogels," Langmuir, 18, pp. 7073-7076 (2002).
Bensch, et al., "Experimental and Theoretical Bandstructure of the Layer Compound ZrSiTe," J. Phys. Chem., 99, pp. 3326-3330. (1995).
Berger, et al., "On the mechanism of carbothermal reduction processes of $TiO_2$ and $ZrO_2$," International Journal of Refractory Metals and Hard Materials, 17:235-243 (1999).
Bhaviripudi, et al., "CVD Synthesis of Single-Walled Carbon Nanotubes from Gold Nanoparticle Catalysts," Journal of the American Chemical Society, 129:1516-1517 (2007).
Chung, Y. H., et al., "Carbon nanotubes from catalytic pyrolysis of polypropylene," Materials Chemistry and Physics, vol. 92, No. 1, Jul. 2005, pp. 256-259.
Downs, et al., "Modification of the surface properties of carbon fibers via the catalytic growth of carbon fibers," Journal of Materials Research, 10:625-633 (1995).
Derycke, V., et al., "Catalyst-free growth of ordered single-walled carbon nanotube networks," Nano Letters, No. 10, Oct. 2002, pp. 1043-1046.
Dupuis, "The catalyst in the CCVD of carbon nanotubes—a review," Progress in Materials Science, 50:929 (2005).
Esconjauregui, et al., "The reasons why metals catalyze the nucleation and growth of carbon nanotubes and other carbon nanomorphologies," Carbon, 47, pp. 659-669, 2009.
Freund, "Metal-supported ultrathin oxide film systems as designable catalysts and catalyst supports," Surface Science, 601:1438-1442 (2007).
Fu, et al., "XPS Study of Copper-Doped Carbon Aerogels," Langmuir, 18:10100-10104 (2002).
Fu, et al., "Formation of Graphitic Structures in Cobalt- and Nickel-Doped Carbon Aerogels," Langmuir, 21, pp. 2647-2651 (2005).
Garcia, et al., "Fabrication and multifunctional properties of a hybrid laminate with aligned carbon nanotubes grown in Situ," Composites Science and Technology, 68, pp. 2034-2041 (2008).
Guittet, et al., "Bonding and XPS chemical shifts in $ZrSiO_4$ versus $SiO_2$ and $ZrO_2$: Charge transfer and electrostatic effects," Physical Review B, 63 (2001).
Hafner, et al., "Catalytic Growth of single-wall carbon nanotubes from metal particles," Chemical Physics Letters, 296, pp. 195-202 (1998).
Hedrick, "Zirconium," United States Geological Survey, Mineral Commodity Summaries, U.S. Department. of the Interior, Reston, VA, vol. 19, pp. 2-193 (2008).
Hofmann, et al., "State of Transition Metal Catalysts During Carbon Nanotube Growth," The Journal of Physical Chemistry C, 113:1648-1656 (2009).
Huang, J. et al., "Catalysts effect on single-walled carbon nanotube branching," Diamond and Related Materials, vol. 16, No. 8, Aug. 2007, pp. 1524-1529.
Huang, et al., "Metal-Catalyst-Free Growth of Single-Walled Carbon Nanotubes on Substrates," Journal of the American Chemical Society, 131:2094-2095 (2009).
Joo, et al., "Multigram scale synthesis and characterization of monodisperse tetragonal zirconia nanocrystals" J. Am. Chem. Soc. 125:6553-6557 (2003).
Kong, et al., "Chemical vapor deposition of methane for single-walled carbon nanotubes," Chemical Physics Letters, 292:567-574 (1998).
Kong, et al., "Synthesis of individual single-walled carbon nanotubes on patterned silicon wafers," Nature, 395:878-881 (1998).
Kurti, et al., "The geometry and the radial breathing mode of carbon nanotubes: beyond the ideal behaviour," New Journal of Physics, 5, (125.1-125.21) (2003).
Kusunoki, et al., "A formation mechanism of carbon nanotube films on SiC(0001)," Applied Physics Letters, vol. 77, No. 4, Jul. 2000, pp. 531-533.
Lee, et al., "Synthesis of carbon nanotubes over gold nanoparticle supported catalysts," Carbon, 43:2654-2663 (2005).
Lee, et al., "Carbon nanotubes produced by tungsten-based catalyst using vapor phase deposition method," Chemical Physics Letters, 361:469-472 (2002).
Li, et al., "The synthesis of single-walled carbon nanotubes over an $Al_2O_3/Fe_2O_3$ binary aerogel catalyst," Journal of Physics: Conference Series, 26:308-311 (2006).
Liu, et al., "Growth of Single-Walled Carbon Nanotubes from Ceramic Particles by Alcohol Chemical Vapor Deposition," Applied Physics Express, 1, (014001-1-014001-3) (2008).
Liu, et al., "Metal-Catalyst-Free Growth of Single-Walled Carbon Nanotubes," Journal of the American Chemical Society, 131:2082-2083 (2009).
Maruyama et al., "Low-temperature synthesis of high-purity single-walled carbon nanotubes from alcohol," Chem. Phys. Lett. 360:229-234 (2002).
Mattevi, et al., "Surface-bound chemical vapour deposition of carbon nanotubes: In situ study of catalyst activation," Physica E, 40:2238-2242 (2008).
Mattevi, et al., "In-situ X-ray Photoelectron Spectroscopy Study of Catalyst-Support Interactions and Growth of Carbon Nanotube Forests," The Journal of Physical Chemistry C, 112:12207-12213 (2008).
McTaggart, "Reduction of Zirconium and Hafnium Oxides," Nature, 191:1192 (1961).
Miller, et al., "A mechanistic study of nitrous oxide adsorption and decomposition on zirconia," Catal. Lett., 46:213-221 (1997).
U.S. Appl. No. 60/417,959, filed Oct. 11, 2005, Kim.
U.S. Appl. No. 60/740,467, filed Nov. 28, 2005, Nejhad et al.
European Search Report dated Sep. 15, 2011 from European Patent Application No. 11176264.7, 8 pages.
Zhu et al., "Direct Synthesis of Long Single-Walled Carbon Nanotube Strands," Science, vol. 296, No. 5569, May 3, 2002: 884-886, XP-002273566, DOI:10.1126/Science.1066969.
Supplementary European Search Report, Application No. EP08828516.8, dated Aug. 25, 2010, 7 pages.
All Office Actions and Amendments filed in U.S. Appl. No. 11/386,378.
International Search Report and Written Opinion dated Dec. 4, 2007 in PCT/US2007/011914.
International Preliminary Report on Patentability and Written Opinion dated Dec. 4, 2008 in PCT/US2007/011914.
International Search Report and Written Opinion dated Feb. 2, 2009 in PCT/US2007/011913.
International Preliminary Report on Patentability and Written Opinion dated Feb. 26, 2009 in PCT/US2007/011913.
International Search Report and Written Opinion dated Jul. 6, 2009 in PCT/US2008/009996.
Barbar, A.H., et al., "Measurement of Carbon Nanotube-Polymer Interfacial Strength," Applied Physics Letters, vol. 82 (23), pp. 4140-4142, 2003.
Bennett, R.D., "Controlling the Morphology of Carbon Nanotube Films by Varying the Areal Density of Catalyst Nanoclusters Using Block Copolymer Micellar Thin Films," Advanced Materials, vol. 18, pp. 2274-2279, 2006.
Bennett, R.D., et al., "Creating Patterned Carbon Nanotube Catalysts through the Microcontact Printing of Block Copolymer Micellar Thin Films," Langmuir, vol. 22, No. 22, pp. 8273-8276, Aug. 23, 2006.

(56) References Cited

OTHER PUBLICATIONS

Bennett, R.D. et al., "Using Block Copolymer Micellar Thin Films as Templates for the Production of Catalysts for Carbon Nanotube Growth," Chemistry of Materials, vol. 16(26), pp. 5589-5598, 2004.
Boskovic, B.O., et al., "Low Temperature Synthesis of Carbon Nanofibres on Carbon Fibre Matrices," Carbon, vol. 43, pp. 2643-2648.
Breuer, O., et al., "Big Returns from Small Fibers: A Review of Polymer/Carbon Nanotube Composites," Polymer Compositions, vol. 25(6), pp. 630-645, 2004.
Cao, A., et al., "Multifunctional Brushes Made from Carbon Nanotubes," Nature Materials, vol. 4, pp. 540-545, 2005.
Ci, L. J., et al., "Direct Growth of Carbon Nanotubes on the Surface of Ceramic Fibers," Carbon, vol. 43(4), pp. 883-886, 2005.
Coleman, J.N., et al., "High-Performance Nanotube-Reinforced Plastics: Understanding the Mechanism of Strength Increase," Advanced Function Materials, vol. 14(8), pp. 791-798, 2004.
Coleman, J.N., et al., "Improving the Mechanical Properties of Single-Walled Carbon Nanotube Sheets by Intercalation of Polymeric Adhesives," Applied Physics Letters, vol. 82(11), pp. 1682-1684, 2003.
Coleman, J.N., et al., "Small but strong: A review of the mechanical properties of carbon nanotube-polymer composites," Carbon, vol. 44, pp. 1-29, 2006.
Cooper, C.A., et al., "Detachment of Nanotubes from a Polymer Matrix," Applied Physics Letter, vol. 81(20), pp. 3873-3875, 2002.
Du, F.M., "Effect of Nanotube Alignment on Percolation Conductivity in Carbon Nanotube/Polymer Composites," Physical Review B, vol. 72(12), 2005.
Endo, M. et al, "Atomic Nanotube Welders: Boron Interstitials Triggering Connections in Double-Walled Carbon Nanotubes," Nano Letters, vol. 5(6), pp. 1099-1105, 2005.
Fan, S.S., et al. "Self-Oriented Regular Arrays of Carbon Nanotubes and Their Field Emission Properties," Science, vol. 283(5401), pp. 512-514, 1999.
Garcia, E.J. et al., "(Student Paper) Fabrication and Testing of Long Carbon Nanotubes Grown on the Surface of Fibers for Hybrid Composites," presented at the 47th AIAA/ASME/ASCE/AJS/ASC Structures, Structural Dynamics, and Materials Conference, Newport, RI, May 1-4, 2006.
Hart, A.J., "Chemical, mechanical, and thermal control of substrate-bound carbon nanotube growth," Doctoral Thesis, Department of Mechanical Engineering, Dec. 31, 2006.
Hart, A.J., et al, "Desktop Growth of Carbon Nanotube-Monoliths with in Situ Optical Imaging," Small Journal, vol. 3, No. 5, pp. 772-777, Apr. 5, 2007.
Hart, A.J., et al., "Force Output, Control of Film Structure, and Microscale Shape Transfer by Carbon Nanotube Growth under Mechanical Pressure," Nano Letters, vol, 6, No. 6, pp. 1254-1260, 2006.
Hart, A.J., et al., "Growth of Conformal Single-Walled Carbon Nanotube Films from Mo/Fe/Al2O3 Deposited by Electron Beam Evaporation," Carbon, vol. 44(2), pp. 348-359, 2006.
Hart, A.J., et al., "Rapid Growth and Flow-Mediated Nucleation of Millimeter-Scale Aligned Carbon Nanotube Structures from Thin-Film Catalyst," Journal of Physical Chemistry B, vol. 110, Mar. 10, 2006, pp. 8250-8257.
Kis, A., et al, "Reinforcement of Single-Walled Carbon Nanotube Bundles by Intertube Bridging," Nature Materials, vol. 3(3), pp. 153-157, 2004.
Koratkar, N.A., et al., "Multifunctional Structural Reinforcement Featuring Carbon Nanotube Films," Composites Science and Technology, vol. 63, pp. 1525-1531, 2003.
Krasheninnikov, A.V., et al., "Ion-Irradiation-Induced Welding of Carbon Nanotubes," Physical Review B, vol. 66(24):245403-1-6, 2002.
Krasheninnikov, A.V. et al., "Irradiation Effects in Carbon Nanotubes," Nuclear Instruments and Methods in Physics Research B, vol. 216, pp. 355-366, 2004.
Kwok, K., et al., "Continuous Deposition of Carbon Nanotubes on a Moving Substrate by Open-Air Laser-Induced Chemical Vapor Deposition," Carbon, vol. 43(12), pp. 2571-2578, 2005.
Sandler, J.K.W., et al., "Ultra-Low Electrical Percolation Threshold in Carbon-Nanotube-Epoxy Composites," Polymer, vol. 44(19), pp. 5893-5899, 2003.
Terrones, M., et al., "Controlled Production of Aligned-Nanotube Bundles," Nature, vol. 388(6637), pp. 52-55, 1997.
Thostenson, E.T., et al., "Advances in the Science and Technology of Carbon Nanotubes and Their Composites: A Review," Composites Science and Technology, 61(13): 1899-1912, 2001.
Thostenson, E.T., et al., "Carbon Nanotube/Carbon Fiber Hybrid Multiscale Composites," Journal of Applied Physics, vol. 91(9), pp. 6034-6037, 2002.
Thostenson, E.T., et al., "Nanocomposites in Context," Composites Science and Technology, vol. 65(3-4): 491-516, 2005.
Veedu, V.P., et al., "Multifunctional Composites Using Reinforced Laminae With Carbon-Nanotube Forests," Nature Materials, vol. 5, pp. 457-462, Jun. 2006.
Wagner, H.D., et al., "Nanotube-Polymer Adhesion: A Mechanics Approach," Chemical Physics Letters, vol. 361(1-2), pp. 57-61, 2002.
Zhao, B., et al., "A Bone Mimic Based on the Self-Assembly of Hydroxyapatite on Chemically Functionalized Single-Walled Carbon Nanotubes," Chem. Mater., vol. 17(120), pp. 3225-3241, 2005.
"Buckypaper Systems for Treatment of Acute Wounds," NanoTech Briefs, Oct. 2005, vol. 2/No. 7, pp. 14-15.
Summons to Attend Oral Proceedings for European Application No. 07795034.3, dated Nov. 29, 2012.
Translation of Japanese-Language Office Action from Japanese Application No. 2009-511087, dated Jul. 31, 2012.
European Office Action from European Application No. 07795034.3, dated Jul. 23, 2009.
European Office Action from European Application No. 07795034.3, dated Sep. 8, 2010.
European Search Report for European Application No. 11196015.9 dated Mar. 16, 2012.
European Search Report for European Application No. 11196014.2 dated Mar. 16, 2012.
Moiseev et al., Effect of iron oxides on the fabrication and properties of continuous glass fibers. Inorganic Materials. 2008;44(9):1026-30.
Su et al., Nanocarbons: Efficiant synthesis using natural lava as supported calayst. Phys. Stat. sol. 2007 (b) 244(11):3916-3919.
Talapatra et al., Direct growth of aligned carbon nanotubes on bulk metals. Nat Nanotechnol. Nov. 2006;1(2):112-6. DOI: 10.1038/nnano.2006.56. Epub Oct. 22, 2006.
Wu et al., Thin-walled carbon nanotubes grown using a zirconium catalyst. Carbon. Jun. 2010;48:1897-1901.
Yi et al., CVD growth and field electron emission of aligned carbon nanotubes on oxidized inconel plates without addition of calayst. Diamond & Related Materials. 2010(19):870-4.
Yenilmez, Erhan, et al., "Wafer scale production of carbon nanotube scanning probe tips for atomic force microscopy." Applied Physics Letters 80.12(2002):2225-2227.
[No Author Listed], Definition of ovipositor. Stedman's Online Medical Dictionary. <http://www.stedmansonline.com/popip.aspx?aid=5222030>. Accessed Feb. 21, 2013.
Bayer et al., Co-catalytic solid-state reduction applied to carbon nanotube growth. J. Phys. Chem. C. 2012; 116(1):1107-1113. DOI: 10.1021/jp210137u.
Coleman et al., Small but strong: A review of the mechanical properties of carbon nanotube-polymer composites. Carbon. 2006; 44:1624-52.
Eres et al., Molecular beam-controlled nucleation and growth of vertically aligned single-wall carbon nanotube arrays. J Phys Chem B. Sep. 8, 2005;109(35): 16684-94. DOI: 10.1021/jp05153.
Fouquet et al., Highly chiral-selective growth of single-walled carbon nanotubes with a simple monometallic Co catalyst. Phys Rev. B. Jun. 6, 2012; 85: 235411.
Garcia et al., (Student Paper) Fabrication and Testing of Long Carbon Nanotubes Grown on the Surface of Fibers for Hybrid Composites. Presented at the 47th AIAA/ASME/ASCE/AJS/ASC

(56) References Cited

OTHER PUBLICATIONS

Structures, Structural Dynamics, and Materials Conference, Newport RI May 1-4, 2006; 11 pages.
Hart et al., Desktop Growth of Carbon-Nanotube Monoliths with in Situ Optical Imaging. Small Journal. Apr. 5, 2007; 3(5): 772-7. DOI: 10.1002/smll.200600716.
Hart et al., Force output, control of film structure and microscale shape transfer by carbon nanotube growth under mechanical pressure. Nano Lett. Jun. 2006;6(6): 1254-60. DOI: 10.1021/nl0524041.
Japanese Office Action from Japanese Application No. JP 2010-521889 dated Sep. 10, 2013.
Hart et al., Growth of Conformal Single-Walled Carbon Nanotube Films from Mo/Fe/A1sub2Osub3, Deposited by Electron Beam Evaporation. Carbon 2006 44(2): 348-59. DOI: 10.1016/j.carbon. 2005.07.008.
Hofmann et al. State of Transition Metal Catalysts During Carbon Nanotube Growth. J. Phys. Chem. C, 2009, 113(5), pp. 1648-1656. DOI: 10.1021/jp808560p.
Kanzow et al., Laser-assisted production of multi-walled carbon nanotubes from acetylene. Chemical Physics Letters. Oct. 23, 1998: 295 (5-6): 525-530.
Karmakar et al., A new approach towards improving the quality and yield of arc-generated carbon nanotubes. J. Phys. D: Appl Phys. 2007; 40 (16): 4829-35.
Karmakar et al., A novel approach towards selective bulk synthesis of few-layer graphenes in an electric arc. J. Phys. D: Appl. Phys. 2009; 42(11): 115201. 14 pages.
Krasheninnikov et al. , Ion-Irradiation-Induced Welding of Carbon Nanotubes. Physical Review B. 2002; 66(24):2455403. 6 pages.
Krasheninnikov et al., Irradiation Effects in Carbon Nanotubes. Nuclear Instruments and Methods in Physics Research B. 2004; 216: 355-366. DOI: 10.1016/j.nimb.2003.11.061.
Kwok et al., Continuous deposition of carbon nanotubes on a moving substrate by open-air laser-induced chemical vapor deposition. Carbon. 2005; 43(12): 2571-8.
Plata et al., Multiple Alkynes Reach with Ethylene to Enhance Carbon Nanotube Synthesis, Suggesting a Polymerization-like Formation Mechanism. ACS Nano. Nov. 4, 2010; 4(12): 7185-92. DOI: 10.1021/nn101842g.
Rummeli et al., Oxide catalysts for carbon nanotube and few layer graphene formation. Physica Status Solidi. B. 2009; 246 (11-12): 2530-3. DOI: 10.1002/pssb.200982259.
Su et al., Natural Lavas as Catalysts for Efficient Production of Carbon Nanotubes and Nanofibers. Angew. Chem. Int. Ed. 2007; 46: 1823-1824.
Terrones et al., Controlled production of aligned-nanotube bundles. Nature. Jul. 3, 1997; 388 (6637): 52-5.
Wirth et al., The phase of iron catalyst nanoparticles during carbon nanotube growth. Chem. Mater. 2012; 24(24): 4633-40. DOI: 10.1021/cm301402g.
Chai, Siang-Piao et al., "The Examination of NiO and CoOx Catalysts Supported on Al2O3 and SiO2 for Carbon Nanotubes Production by Catalytic Chemical Vapor Deposition of M." Carb-Sci. Tech 1 (2008) 24-29.
Office Action dated Jan. 30, 2015 for U.S. Appl. No. 12/953,287.
Japanese Office Action dated Apr. 8, 2014 for Application No. 2012-522814.
Japanese Office Action dated Sep. 8, 2017 for Application No. JP 2013-542178.
Dalton et al., "Super-tough carbon-nanotube fibers," Nature 423(6941):703, Jun. 12, 2003.
Japanese Office Action for Application No. 2013-542178 dated Oct. 3, 2016.
Baughman et al., Carbon nanotubes—the route towards applications. Science. Aug. 2, 2002:297(5582):787-92.
Charlier et al., Electronic and transport properties of nanotubes. Rev. Mod. Phys. May 16, 2007; 79: 677-732.
Li et al., Direct Spinning of carbon nanotube fibers from chemical vapor deposition synthesis. Science. Apr. 9, 2004; 304(5668): 276-278.
Zhang et al., Multifunctional carbon nanotube yarns by downsizing an ancient technology. Science. Nov. 19, 2004;306(5700):1358-61.
Zhang et al., Strong carbon-nanotube fibers spun from long carbon-nanotube arrays. Small. Feb. 2007; 3(2):244-8.
Japanese Office Action for Application No. 2013-542178 dated Oct. 29, 2015.
International Search Report and Written Opinion in International Patent Application Serial No. PCT/US2011/062883, dated Sep. 3, 2013.
[No Author Listed] Product data sheet: HexTow AS4 carbon fiber. Hexcel. Mar. 2010. Accessed May 24, 2013. <http://www.hexcel.com/user_area/content_media/raw/AS4_HexTow_DataSheet.pdf> 2 pages.
Invitation to Pay Additional Fees in International Patent Application Serial No. PCT/US2011/062883, dated Jun. 14, 2013.
International Preliminary Report on Patentability in International Patent Application Serial No. PCT/US2011/062883, dated Oct. 3, 2013.
European Office Action dated Mar. 14, 2018 for Application No. 11797088.9.
Morant, et al., "An XPS study of the interaction of oxygen with zirconium," Surface Science, 218:331-345 (1989).
Murakami, et al., "Direct synthesis of high-quality single-walled carbon nanotubes on silicon and quartz substrates," Chemical Physics Letters, 377:49-54 (2003).
Nishimura, et al., "In Situ Study of Iron Catalysts for Carbon Nanotube Growth Using X-Ray Diffraction Analysis," Japanese Journal of Applied Physics, 43: L471-L474 (2004).
Noda,et al., "Millimeter-Thick Single-Walled Carbon Nanotubes Forests: Hidden Role of Catalyst Support," Japanese Journal of Applied Physics, 46:L399-L401 (2007).
Oya, et al., "Review: Phenomena of catalytic graphitization," Journal of Materials Science, 17:309-322 (1982).
Pekala, et al., "Organic aerogels: microstructural dependence of mechanical properties in compression," Journal of Non-Crystalline Solids, 125:67-75 (1990).
Qian, et al., "Hierarchical Composites Reinforced with Carbon Nanotube Grafted Fibers: The Potential Assessed at the Single Fiber Level," Chemistry of Materials, 20:1862-1869 (2008).
Ritschel, et al., "Rhenium-Catalyzed Growth Carbon Nanotubes," The Journal of Physical Chemistry C, 111:8414-8417 (2007).
Sacks, et al., "Carbothermal reduction synthesis of nanocrystalline zirconium carbide and hafnium carbide powders using solution-derived precursors," Journal of Materials Science, 39, pp. 6057-6066 (2004).
Saito, et al., "Double resonance Raman spectroscopy of single-wall carbon nanotubes," New Journal of Physics, 5, (157.1-157.15) (2003).
Sharma, et al., "Site-Specific Fabrication of Fe Particles for Carbon Nanotube Growth," Nano Letters, 9:689-694 (2009).
Steiner III et al., "Iron-Doped Carbon Aerogels: Novel Porous Substrates for Direct Growth of Carbon Nanotubes," Langmuir, 23:5161-5166 (2007).
Steiner III, Master's Thesis, Engineering Carbon Structures: Development of Novel Aerogel-Nanotube Composites and Optimization Techniques for Nanotube Growth, Massachusetts Institute of Technology, (2006).
Steiner III et al., "Nanoscale zirconia as a nonmetallic catalyst for graphitization of carbon and growth of single- and multiwall carbon nanotubes," J. Am. Chem. Soc. 131:12144-12154 (2009).
Takagi, D., et al. "Carbon Nanotube Growth from Semiconductor Nanoparticles," Nano Letters, vol. 7, No. 8, Jul. 2007, pp. 2272-2275.
Takagi, et al., "Single-Walled Carbon Nanotube Growth from Highly Activated Metal Nanoparticles," Nano Letters, 6:12, 2642-2645 (2006).
Tomaszewski et al., "Influence of Oxygen Partial Pressure on the Metastability of Undoped Zirconia Dispersed in Alumina Matrix," Journal of the European Ceramic Society, 15:17-23 (1995).
Tomishige, et al., "A novel method of direct synthesis of dimethyl carbonate from methanol and carbon dioxide catalyzed by zirconia," Catal. Lett., 58:225-229 (1999).

(56) References Cited

OTHER PUBLICATIONS

Vander Wal, et al., "Substrate-support interactions in metal-catalyzed carbon nanoflber growth," Carbon, 39:2277-2289 (2001).
Wang, "Bimetallic Catalysts for the Efficient Growth of SWNTs on Surfaces," Chemistry of Materials, 16:799-805 (2004).
Won, et al., "Growth of ZrC thin films by aerosol-assisted MOCVD," Journal of Crystal Growth, 304:324-332 (2007).
Wong, et al., "Carbon nanotubes field emission devices grown by thermal CVD with palladium as catalysts," Diamond and Related Materials, 13:2105-2112 (2004).
Yuan, et al., "Horizontally Aligned Single-Walled Carbon Nanotube on Quartz from a Large Variety of Metal Catalysts," Nano Letters, 8:2576-2579 (2008).
Yamada, et al., "Synthesis and diameter control of multi-walled carbon nanotubes over gold nanoparticle catalysts," Applied Catalysis, A: General, 302:201-207 (2006).
Yamamoto, et al., "High-yield growth and morphology control of aligned carbon nanotubes on ceramic fibers for multifunctional enhancement of structural composites," Carbon, 47, pp. 551-556 (2009).
Zhou, et al., "Copper Catalyzing Growth of Single-Walled Carbon Nanotubes on Substrates," Nano Lett., 6, 2987-2990 (2006).
Zyuzin, et al., "X-ray, Raman and FTIRS studies of the miscrostructural evolution of zirconia particles caused by the thermal treatment," Journal of Solid State Chemistry, 179:2965-2971 (2006).
Jasso, P. et al. "Nanostructured Carbon on Steam Reforming Catalysts". Journal of New Materials for Electrochemical Systems 11, 95-98 (2008).
Ferlauto, A. S., et al. "Chemical vapor deposition of multi-walled carbon nanotubes from nickel/yttria-stabilized zirconia catalysts". Applied Physics A. Aug. 2006, vol. 84, Issue 3, pp. 271-276.
Han et al, Diameter-Controlled Synthesis of Discrete and Uniform-Sized Single-Walled Carbon Nanotubes Using Monodisperse Iron Oxide Nanoparticles Embedded in Zirconia Nanoparticle Arrays as Catalysts. The Journal of Physical Chemistry B 2004 108 (24): 8091-8095.
Fazaneh, F., and N. Faal Hamedani. "Preparation of carbon nanotubes by CVD process over nanoparticles of Ni—Ce—Zr mixed oxides." J. Sci. Islam. Repub. Iran 19.2 (2008): 119-123.
Chinese Office Action for Application No. CN 201080041244.4 dated Oct. 8, 2013.
Fang et al., CVD synthesis of CNTs using bimetal catalyst with different atomic ratio supported on ZrO2. Journal Zhejiang University of Technology. Feb. 28, 2005;33(1):88-92.
Japanese Office Action dated Apr. 16, 2018 for Application No. JP 2016-137695.
Andrews et al., Continuous production of aligned carbon nanotubes: a step closer to commercial realization. Chem Phys Lett. Apr. 16, 1999; 30: 467-474.
European Office Action dated Feb. 26, 2018 for Application No. EP 07867126.0.
Hong et al., Synthesis of Carbon Nanotubes Using Microwave Radiation; Adv. Funct. Mater; 13, No. 12; 961-966; 2003.
European Office Action dated Jun. 27, 2017 for Application No. 11176264.7.
European Office Action dated Jun. 19, 2017 for Application No. 07867126.0.
Japanese Rejection of Appeal dated Jun. 8, 2017 for JP 2013-133735.
Japanese Office Action dated Jun. 29, 2017 for JP 2016-036457.
Japanese Office Action dated May 24, 2017 for JP 2016-137695.
International Search Report and Written Opinion dated Aug. 9, 2017 for Application No. PCT/US2017/035094.
Office Communication dated Jan. 5, 2011 for U.S. Appl. No. 11/895,621.
Office Communication dated Aug. 8, 2011 for U.S. Appl. No. 11/895,621.
Office Communication dated Feb. 14, 2012 for U.S. Appl. No. 11/895,621.
Notice of Allowance dated Aug. 16, 2012 for U.S. Appl. No. 11/895,621.
Office Communication dated Oct. 11, 2013 for U.S. Appl. No. 13/679,371.
Office Communication dated May 7, 2014 for U.S. Appl. No. 13/679,371.
Interview Summary dated Jul. 14, 2014 for U.S. Appl. No. 13/679,371.
Office Communication dated Mar. 11, 2015 for U.S. Appl. No. 13/679,371.
Office Communication dated Sep. 24, 2015 for U.S. Appl. No. 13/679,371.
Office Communication dated Jul. 27, 2016 for U.S. Appl. No. 13/679,371.
Office Communication dated Nov. 30, 2016 for U.S. Appl. No. 13/679,371.
Office Communication dated Jun. 16, 2017 for U.S. Appl. No. 13/679,371.
Bauhofer et al., A review and analysis of electrical percolation in carbon nanotube polymer composites. Compos Sci Technol. 2009;69:1486-98.
Bradshaw et al., Fiber waviness in nanotube-reinforced polymer composites-II: modeling via numerical approximation of the dilute strain concentration tensor. Comp Sci Technol. 2003;63:1705-22.
Kundalwal et al., Effective thermal conductivities of a novel fuzzy fiber-reinforced composite containing wavy carbon nanotubes. Journal of Heat Transfer.Jan. 2015; 137:012041-01-12401-12.
Motamedi et al., Effect of straight and wavy carbon nanotube on the reinforce modulus in nonlinear elastic matrix nanocomposites. Materials and Design. Feb. 2012; 34:603-8.
Natarajan et al., The evolution of carbon nanotube network structure in unidirectional nanocomposites resolved by quantitative electron tomography, with Supplemental Information. ACS Nano. 2015;9(6):6050-8.
Ray et al., Load transfer analysis in short carbon fibers with radially-aligned carbon nanotubes embedded in a polymer matrix. J. Adv. Mater. Oct. 2009;41(4):82-94.
Stein, et al., Aligned carbon nanotube array stiffness from stochastic three-dimensional morphology. Nanoscale 2015;7:19426-31.
Wardle et al., Fabrication and characterization of ultrahigh-volume-fraction aligned carbon nanotube-polymer composites. Adv. Mater. 2008;20:2707-14.
Yaglioglu et al., Wide range control of microstructure and mechanical properties of carbon nanotube forests: A comparison between fixed and floating catalyst CVD techniques. Adv Funct Mater. 2012:1-10.
Merchan-Merchan et al., High-rate flame synthesis of vertically aligned carbon nanotubes using electric field control; Carbon; 2004: 42,599-608.
Japanese Office Action dated Apr. 3, 2017 for JP 2014-256272.
Japanese Appeal Decision dated Jul. 7, 2016 for JP 2009-511086.
Japanese Office Action dated Jul. 20, 2016 for JP 2014-256272.
Japanese Office Action dated Sep. 26, 2016 for JP 2016-36457.
Hart et al.,Versitility of the Fe/A1sub2/Osub3 system for high-yield carbon nanotube growth by thermal CVD of Csub2Hsub4. NT05: Sixth International Conference on the Science and Application of Nanotubes; Goteborg University, Chalmers University of Technology, and University College of Boras; (Gothenburg, Sweden); Jun. 26-Jul. 1, 2005. Abstract.
Hart et al.,Versitility of the Fe/A1sub2/Osub3 system for high-yield carbon nanotube growth by thermal CVD of Csub2Hsub4. NT05: Sixth International Conference on the Science and Application of Nanotubes; Goteborg University, Chalmers University of Technology, and University College of Boras; (Gothenburg, Sweden); Jun. 26-Jul. 1, 2005. Poster.
European Decision to Refuse dated Mar. 28, 2013 for Application No. EP 07795034.3.
Japanese Office Action dated Nov. 10, 2017 for Application No. 2017-008808.
Japanese Office Action dated Mar. 24, 2016 for JP 2013-133735.
Japanese Denial of Entry of Amendment dated Mar. 24, 2016 for JP 2013-133735.
Japanese Office Action dated Dec. 2, 2015 for Application No. JP-2009-511086.

(56) References Cited

OTHER PUBLICATIONS

European Office Action dated Jun. 26, 2015 in connection with EP 11196015.9.
Japanese Final Official Action dated Aug. 18, 2014 for Application No. JP 2009-511086.
Japanese Office Action dated Feb. 19, 2014 for Application No. JP 2009-511086.
European Office Action dated Dec. 3, 2012 in connection with EP11196015.9.
Japanese Office Action dated Dec. 28, 2012 in connection with JP 2009-511086.
European Office Action dated Apr. 26, 2011 in connection with EP 08828516.8.
European Office Action dated Sep. 19, 2011 in connection with EP 08828516.8.
Intent to Grant dated Feb. 11, 2013 in connection with EP 08828516.8.
Intent to Grant dated May 7, 2013 in connection with EP 08828516.8.
Notice of Allowance dated Jan. 26, 2017 for U.S. Appl. No. 13/284,021.
[No Author Listed], Chemical Vapor Disposition. Wikipedia <https://en.wikipedia.org/wiki/Chemical_vapor_deposition> Accessed Mar. 5, 2015.
[No Author Listed], Carbon enhanced reinforcements: A new class of engineered materials. Owens Corning: Innovations for Living. 1 page. Accessed Nov. 2, 2011.
[No Author Listed], "Basalt Chopped Fiber Strands," Basalt Gold Co. LTD. <ttp://www.basaltfiber-gbf.com/basalt-chopped-strands-supplier.html>, Accessed Jun. 12, 2005.
Chhowalla et al., Growth process conditions of vertically aligned carbon nanotubes using plasma enhanced chemical vapor disposition. Journal of Applied Physics. 2001 90.10: 5308-5317.
De Villoria et al., Continuous high-yield production of vertically aligned carbon nanotubes on 2D and 3D substrates. American Chemical Society 2011;5(6):4850-7. Supporting Information included. 11 pages.
Drobot et al., Study of basalts by local x-ray spectrum analysis. Inorganic Materials. 2009;45(3):281-6.
Gutnikov et al., Influence of alumina on the properties of continuous basalt fibers. Russian Journal of Inorganic Chemistry. 2009;54(2): 191-6.
Huang et al., Nano Effects of Helium Plasma Treatment Carbon Nanotubes Coating Basalt Filament. Material Science Forum 2009 610-613: 722-727.
Karwa et al., Scaled-up self-assembly of carbon nanotubes inside long stainless steel tubing. Carbon. 2006; 44:1235-42.
Khan et al., Electrical transport properties of Ni95Ti5 catalyzed multi wall carbon nanotubes film. Journal of Nanomaterials. 2009. 8 pages.
LaCasse et al., Growth of Multiwalled Carbon Nanotubes on Carbon Fabric. Accessed online at <https://smartech.gatech.edu/bitstream/handle/1853/21628/lacasse_lec_undergrad.pdf>. Believed to have been available online in Jun. 2009.
Li et al., Preparation of regular coiled carbon nanotubes and their structures. Gaojishu Tongxun. Apr. 1997;7(1):19-21. STN Database Accession No. 194404.
Miao et al., Growth of carbon nanotubes on transition metal alloys by microwave-enhanced hot-filament deposition. Thin Solid Films. Jul. 2005;484:58-63.
Japan Patent Office (JPO) Notification of Reasons for Refusal for Application No. 2015-560360 dated Jan. 22, 2018 (2 Pages).
English translation of Japan Patent Office (JPO) Notification of Reasons for Refusal for Application No. 2015-560360 dated Jan. 22, 2018 (3 pages).

\* cited by examiner

CARTRIDGE-BASED DISPENSING OF NANOSTRUCTURE FILMS

STATEMENT REGARDING FEDERALLY SPONSORED RESEARCH OR DEVELOPMENT (Not Applicable)

BACKGROUND

The present disclosure is directed generally to a method and apparatus for dispensing nanostructures, and is directed more specifically to a method and apparatus for dispensing nanostructures such as nanotubes that may be aligned and using a cartridge or cassette provisioned with a flexible substrate tape that houses the nanostructures.

Nanostructure films, including carbon nanotube (CNT) films, have a sensitive morphology and many final properties of composite materials that include nanotube films depend upon maintaining the morphology of the nanostructures in their construction. In particular, nanostructures can be arranged wherein the long axis of the nanostructures are substantially aligned with each other in a large grouping, in which the nanostructures are parallel to each other, thereby forming a "forest" of nanostructures. When nanostructures are used to construct composite materials such as fiber reinforced plastics or nanocomposites, certain types of materials benefit from employment of a nanostructure forest with respect to directional reinforcement. Accordingly, maintaining the alignment and spatial orientation of the group of parallel nanostructures during a composite material manufacturing process can be an important goal to producing composite materials with specific directional reinforcement. In particular, maintaining alignment of the parallel nanostructures so that they are dispersed uniformly and non-parallel to the interface of composite material layers or plies is of particular interest. This arrangement is commonly considered z-direction or interlaminar reinforcement in composite materials.

Various techniques are known to align and group nanostructures in parallel. For example, U.S. Pat. No. 6,892,432 discusses alignment of nanotubes in parallel on a knife edge. In addition, transport of nanotubes in a sealed container is known. For example, WO 2012011624 discusses an enclosure that can be used to house and transport nanotubes in a sealed environment. It is also known to dispense nanotubes that are dispersed in various media, including liquids, such as is described in U.S. Pat. No. 7,842,522, which discusses deposition of nanotube ink using a device such as an ink jet printer. However, despite the advances in nanotube technology described above, challenge on how to house and transport and dispense nanotubes that are aligned with each other and grouped in parallel while protecting against real or perceived environmental, health or safety concerns regarding the handling of nanotube material continue to be presented.

SUMMARY

In accordance with the present disclosure, systems and methods are presented for housing, transporting and dispensing nanostructure material that can maintain the morphology of the nanostructures. For example, carbon nanotubes (CNTs) where the long axes are aligned in parallel with each other can be maintained in their spatial configuration. The nanostructures are disposed on a flexible substrate that can be spooled into a roll that represents a compact shape that permits the substrate to be fed to an application to deposit the nanostructures to a desired target. The substrate can be provided with raised edges that offset a surface of the substrate from a back surface of the substrate upon being spooled into a roll to protect the nanostructure alignment from damage or misalignment. The spooled substrate with nanostructures disposed thereon can be provisioned in a cassette that can be sealed to protect against real or perceived environmental, health or safety concerns regarding handling nanostructure material. The substrate can be indexed in the cassette to permit nanostructures disposed on the substrate to be deployed to an object or material while maintaining the parallel alignment of the nanostructures.

According to an aspect of the disclosure, nanostructure films are dispensed using a tape and cartridge system. After nanostructure growth, the nanostructure films are transferred to a backing media or film, creating a nanostructure tape. The backing media may contain a spacing or edge material that protects the nanostructure film and allows it to be collected (spooled) into rolls. The nanostructure tape is placed in a cartridge or cassette designed to fit automatic tape laying or automated fiber placement machines commonly used in the composite fabrication industry. According to another aspect, the cassette or cartridge is designed for use with a hand-held device for manual lay-up of composite materials.

According to another aspect, nanostructure films are supplied to a flexible substrate where the nanostructures are aligned in a direction away from a surface of the substrate, e.g., "standing up" on the substrate, sometimes referred to as a z-direction, or can be horizontally knocked-down or randomly oriented in the film provided to the substrate. The nanostructure films, which may be composed of carbon nanotubes, may or may not contain a resin system such as an epoxy resin material. The nanostructure film is transferred to a removable backing media such as polytetrafluroethylene, polyimide, polyester, polyacrylamide, polyvinyl chloride, polyurethane, a paper, a metal foil, a polymer, a metal film, a paper film, release liner, cellophane, clay-coated Kraft paper, polypropylene, glassine, polyethylene, silicone or other commonly used composite fabrication materials.

According to another aspect, the cartridge or cassette permits the nanostructure forest to be protected during transport to a composite fabrication site without damaging the nanostructures or their morphology. The controlled dispensing of the nanostructure forest allows the material to be deposited in a precise, controlled and repeatable manner, ensuring adequate transfer, coverage, uniformity, and morphology. The cartridge system ensures containment of the nanostructure film, protecting the user from exposure and protecting the nanostructure forest from exposure.

According to another aspect, the cartridge or cassette consists of an enclosure that houses a spool of flexible substrate and nanostructure film disposed thereon. According to a particular aspect, the cartridge or cassette includes a supply and a collection reel, with the unused nanostructure tape, which includes the flexible substrate and nanostructure film disposed thereon, being placed on the supply reel. A system of internal rollers for tensioning and placement guides the nanotube tape to a dispensing head. At the dispensing head, the nanotube film is placed in contact with an external object. The external object may be a pre-preg surface, composite material, adhesive film, metal surface, or any other material or object to which the nanostructure film can be applied. During deposition, the nanostructure film is transferred to the external object and separated from the backing media. Controlled pressure and/or distance maybe applied by the dispensing head to assist in adhesion of the nanotube film to the external object. The backing media is collected on the collection reel after separation from the nanostructure film. The cartridge or cassette can be provisioned with facilities to manage floating particles, such as vacuum nozzles and/or air knives.

According to another aspect, a cassette is provisioned with a spool of nanostructure tape, which is composed of a flexible substrate and a nanostructure film disposed thereon. The nanostructure tape is fed from the cassette to permit application of the nanostructure film to an object or material by separating the nanostructure film from the flexible substrate, which is collected by a separate reel that can be internal or external to the cassette. According to this aspect, the cassette can be used with a manual lay-up device for disposing a nanostructure film on an object or material.

According to another aspect, the cassette may be provided with various controls and actuators for controlling the nanostructure tape and the dispensing of the nanostructure film. The cassette may also be provided with an interface for communicating with automated machinery for tape laying or fiber placement. The interface permits the exchange of data, including commands and parameters to perform functions that can be carried out by controllers or actuators in the cassette, or by the automated machinery in conjunction with the cassette. For example, functions that the cassette may be capable of performing can include: advance/rewind tape, dispense tape, stop/start, apply heat, speed-up/slow-down, move nearer/move farther, and any other type of function that can be used to control the nanostructure tape or deployment of the nanostructure film.

According to another aspect, the nanostructure tape is provided with raised edges to protect the nanostructure film when the tape is spooled into a coil or roll. The edges of the tape are offset from the surface of the tape on the same or opposite side on which the nanostructure film is disposed by a distance that is greater than the height of the nanostructures standing on the tape or flexible substrate. In preparation of a deposition of the nanostructure film to a material or object and separation of the nanostructure film from the backing media, the raised edges of the tape or flexible substrate may or may not be removed to permit an upper region of the nanostructure film to be placed in contact with a material or object on which it is to be disposed. According to this aspect, the raised edges can be composed of strips that can be peeled away from the tape, or cut from the tape edges prior to exposing the top region of the nanostructure film to the object or material on which it is to be disposed.

According to another aspect, the raised edges of the tape are gauged to be approximately or precisely the height of the nanostructure film. With this aspect, the raised edges of the tape can be initially formed to be higher than the height of the nanostructure film to obtain a gap or space between layers of the tape and nanostructure film in a stacked or coiled configuration. Upon initiation of a lay-up operation to dispose the nanostructure film on an object or material, the raised edges can be shortened to a desired height to act as a stand-off for metering the proper spacing of the nanostructure tape from the surface of the object or material to which the nanostructure film is to be applied. With this configuration, the raised edges can perform a spacing function for the nanostructure film to permit the nanostructure film to be transferred to the object or material without damaging the alignment or morphology of the nanostructures in the nanostructure film.

The term "nanostructure film" as used herein is intended to describe a layer of material that may include various discrete materials, including nanostructures composed of various materials, carbon nanotubes, nanowires, or nanofibers. As used herein, the term "nanostructure" refers to elongated chemical structures having a diameter on the order of nanometers and a length on the order of microns to millimeters, resulting in an aspect ratio of 10, 100, 1000, 10,000 or greater. The film may be "dry," or composed of nanostructures alone, or may be composed of nanostructures included in various media, including resins or epoxies or other suitable material for hosting nanostructures to take advantage of one or more of the particular characteristics of nano structures.

BRIEF DESCRIPTION OF THE SEVERAL VIEWS OF THE DRAWINGS

Various embodiments of the present disclosure are described in greater detail below, with reference to the accompanying drawings, in which.

DETAILED DESCRIPTION OF THE INVENTION

The present application claims benefit of U.S. Provisional Application No. 61/771,072, filed Feb. 28, 2013 and entitled "METHOD AND APPARATUS FOR CARTRIDGE-BASED DISPENSING OF ALIGNED CARBON NANOTUBE FILMS," the entire contents of which are hereby incorporated herein by reference.

In accordance with the present disclosure, methods and systems for housing, transporting and dispensing nanostructure films are provided. In accordance with some embodiments, a cassette is provided with a roll of tape to which a nanostructure film has been previously transferred. The cassette is used to dispense the nanostructure film by indexing the roll of tape and positioning portions of the indexed tape in proximity with an object or material to which the nanostructure film is to be applied. The cassette is designed to be controlled by an automated tape laying (ATL) or automated fiber placement (AFP) machine, or employed with a hand held tape laying or fiber placement device for manual lay-up operation.

The tape is constructed to have raised edges that function as a stand-off to protect the nanostructure film on the tape when the tape is spooled into a roll. This tape configuration permits high density nanostructure film storage, transportation and protection, while maintaining the integrity of the nanostructure film.

The nanostructure film described in the present disclosure can be composed of nanostructures of any composition, including carbon nanotubes, nanowires, or nanofibers, disposed in various alignments, configurations or in random orientation. The nanostructure film can be composed of "dry" nanostructures, e.g., nanostructures alone, or as nanostructures dispersed in a medium that potentially provides the nanostructure film with desired properties. For example, the nanostructure film can be composed of dry nanostructures or nanostructures with a resin system, such as an epoxy resin material. The nanostructure film may be constructed to maintain a particular morphology, such as by providing nanostructures in a vertically-aligned "standing" arrangement, sometimes referred to as a z-direction, such that the nanostructures are aligned and parallel as a nanostructure "forest" and non-parallel to the surface of the tape to which they are transferred. The nanostructure film can be composed of horizontally knocked-down nanostructures, or randomly oriented nanostructures to obtain particular characteristics for the film upon being disposed on a material or object during a lay-up process.

Figure 1:
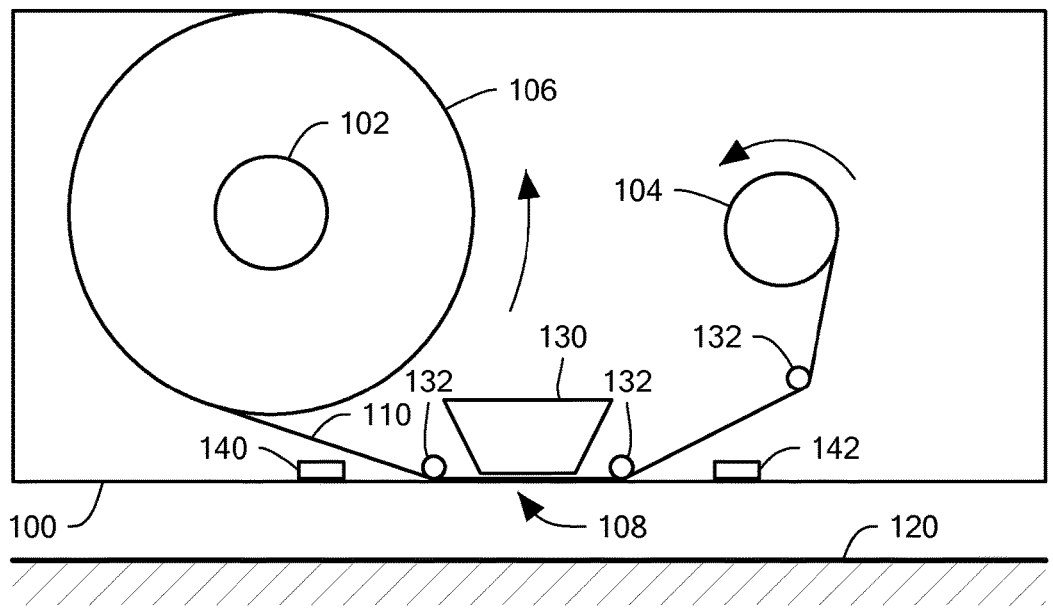
FIG. 1 is a diagram of a cassette for housing and dispensing a nanostructure film in accordance with an exemplary embodiment of the present disclosure.

Referring now to FIG. 1, a cassette 100 is illustrated in accordance with an exemplary embodiment of the present disclosure. Cassette 100 includes two reels, a supply reel 102 and a take-up real 104. Reels 102, 104 each turn in a counter-clockwise direction, and either or both of reels 102, 104 can be driven. It should be understood that the positions of supply reels 102, 104 can be switched, and the direction of rotation can also be reversed, so that the operation of cassette 100 can be implemented in any particular desired orientation or direction.

Cassette 100 is illustrated as being in a fully provisioned state with a full roll 106 of nanostructure tape 110 that is ready to be indexed to take up reel 104 in a nanostructure dispensing process. An opening 108 is provided at a suitable position in cassette 100 to externally expose a nanostructure film disposed on tape 110, to permit the nanostructure film to be applied to an object or material 120. For storage, transportation or exposure protection, opening 108 can be covered with a removable sealing structure (not shown) such as a plastic tape or film or plug to seal opening 108 and contributing to maintaining cassette 100 as a sealed internal environment. Upon deployment, such a sealing structure can be removed to expose the nanostructure film on tape 110 through opening 108 for external application.

Cassette 100 includes a dispensing head 130 that is positioned in proximity to opening 108 and on an internal side of tape 110, e.g., opposite to the side bearing the nanostructure film. Dispensing head 130 is coupled to an actuator (not shown) that can control the position of dispensing head 130 to permit dispensing head 130 to move toward and away from opening 108. In particular, dispensing head 130 can be used to control the presentation position of tape 110 that is indexed by opening 108 to permit the nanostructure film on tape 110 to be dispensed through opening 108 by contacting object or material 120. Accordingly, dispensing head 130 may project through opening 108 to provide the desired positioning for tape 110 as tape 110 is indexed by opening 108.

The actuation and displacement of dispensing head 130 can be controlled by a control system provided to cassette 100 that uses a distance measurement sensor, discussed in greater detail below, to measure a distance between tape 110 and object or material 120. The measured distance detected by the sensor is provided to the actuation and displacement control system controlling the position of dispensing head 130 to cause dispensing head 130 to maintain a specified distance between tape 110 and object or material 120, and/or a specified pressure on tape 110, by contacting and positioning tape 110 through opening 108. The control system for dispensing head 130, including a distance sensor and/or pressure sensor and actuator can be located in whole or in part within cassette 100, and powered internally with an electrical power source, such as a battery, or it can be located in whole or in part in an ATL or AFP machine to perform the control functions with respect to dispensing head 130 to control the distance and/or pressure of tape 110 with respect to object or material 120.

Cassette 100 includes several internal rollers 132 that assist in positioning tape 110 and/or contribute to maintaining a desired tension for tape 110. For example, one or more of rollers 132 can be displaceable on a resilient structure, such as a spring or active tensioner, to provide an urging force against tape 110 as tape 110 is indexed. In addition, or alternatively, reels 104 and/or 102 can be driven and inspected with a tension sensor to determine a tensioning feedback for the drive of one or both of reels 102, 104. Such a tensioning control system can be provided in whole or in part internally to cassette 100 along with an internal power source, such as a battery, or it can be provided in whole or in part externally, such as in an ATL or AFP machine in which cassette 100 is installed. It should be understood that rollers 132 can also be eliminated from cassette 100 and supplied by an external machine in which cassette 100 is deployed.

Cassette 100 may also be provided with various sensors or actuators to obtain desired functions for a lay-up operation involving the nanostructure film on tape 110. For example, a heat source 140 may be provided to heat tape 110 or object or material 120 to contribute to the release of the nanostructure film from tape 110, and/or the adherence of the nanostructure film to object or material 120. As with the other control systems discussed above, a control system for heat source 140 can be self-contained in whole or in part in cassette 100, or provided in whole or in part by external machinery. Heat source 140 can also be located in whole or in part in cassette 100 or on external machinery and operated in accordance with desired control profiles to obtain desired lay-up operational characteristics.

A sensor 142 can also be provided to cassette 100 or to external machinery to obtain various sensing functionality for a lay-up process. For example, sensor 142 can detect various physical phenomenon, such as distance between itself and object or material 120, and/or can be provided with temperature sensing capability to detect a temperature of object or material 120. In addition, or alternatively, sensor 142 can detect position of cassette 100 with respect to previously disposed nanostructure films, to permit cassette 100, and opening 108, to be positioned as desired to obtain specified lay-out characteristics for the nanostructure films deposited on object or material 120. Sensor 142 can thus be used in the control systems discussed previously for controlling the position of dispensing head 130, an output of heat source 140, speed or position of tape 110, as driven by reels 102 and/or 104. Sensor 142 can be implemented according to any desired technique that provides a desired sensitivity. For example, sensor 142 can be implemented as an optical sensor, laser sensor, microscopy sensor, acoustic sensor, vision inspection sensor, or any other type of sensor suitable for a given application.

Figure 2:
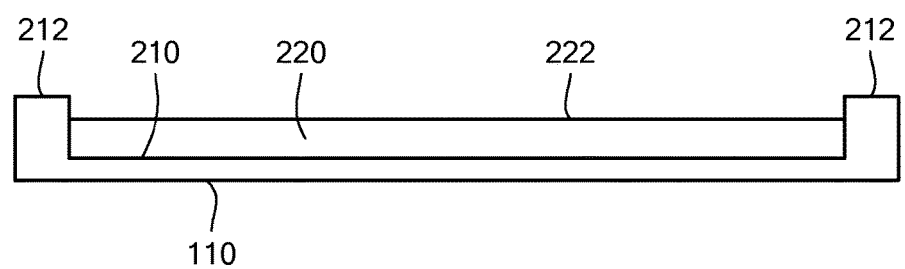
FIG. 2 is a cross-sectional view of a nanostructure tape according to an exemplary embodiment of the present disclosure.

Referring now to FIG. 2, a cross-sectional view of tape 110 is illustrated in greater detail. Tape 110 includes a backing media 210 upon which is disposed nanostructure film 220. Backing media 210 is designed to permit nanostructure film 220 to be transferred to tape 110, and be releasable in a dispensing operation, such as may be implemented with cartridge 100 (FIG. 1) as discussed above. Backing media 210 can be composed of such materials as polytetrafluroethylene, polyimide, polyester, polyacrylamide, polyvinyl chloride, polyurethane, a paper, a metal foil, a polymer, a metal film, a paper film, release liner, cellophane, clay-coated Kraft paper, polypropylene, glassine, polyethylene, silicone or other commonly used composite fabrication materials that nanostructure film 220 can be temporarily adhered to and then released in an operation such as may be implemented in a lay-up operation for fabrication of composite materials.

Tape 110 includes raised edges 212 that operate as stand offs to protect nanostructure film 220 from impact, exposure or damage. Raised edges 212 may be composed of a same material as backing media 210 or tape 110, and can be applied to tape 110 as releasable strips. For example, raised edges 212 can be applied to tape 110 as strips of material that are intended to be temporarily adhered to tape 110, and removed prior to the deposition of nanostructure film 220 in a lay-up operation.

According to some embodiments of the present disclosure, nanostructure film 220 is adhered to an object or material, such as object or material 120 (FIG. 1) by contacting a top surface 222 of nanostructure film 220 to the object or material. Top surface 222 preferably adheres to the object or material with a stronger adhesion force than is obtained between nanostructure film 220 and backing media 210, so that nanostructure film 220 releases from backing media 210 to be disposed on the object or material. In such an embodiment, top surface 222 is place in contact with the object or material according to a measured distance to the surface of the object or material, and/or in accordance with a specified pressure applied to nanostructure film 220. In such an operation, top surface 222 contact the object or material with greater adhesion than that obtained between nanostructure film 220 and backing media 210 to permit nanostructure film 220 to release to the object or material. Various catalysts can be employed to contribute to the release, as discussed in greater detail below.

Because in some embodiments raised edges 212 of tape 110 can potentially prevent top surface 222 from contacting the object or material, they can be removed prior to disposing nanostructure film 220 onto the object or material. Raised edges 212 can be removed according to a number of different techniques, which may depend on how raised edges 212 are constructed. For example, raised edges 212 can be cut, compressed, peeled off of tape 110, melted or deformed away from nanostructure film 220 or tape 110. In the case where raised edges 212 are peeled away, they are provided to tape 110 as releasably adhered strips that can be mechanically removed. In another example, the raised edge portion of the tape may be perforated to assist in removal prior to deposition. Other removal techniques correspond to the construction and disposition of raised edges 212 to permit their removal. Any known manufacturing technique can be used to form raised edges 212 in anticipation of their subsequent removal during the deposition process of nanostructure film 220. For example, raised edges 212 can be composed of ferro-magnetic material that can be removed in the presence of a magnetic field, or can be electrically charged and removed in the presence of an electric field. In general, any type of process that permits raised edges 212 to be disposed on tape 110, and removed prior to deposition of nanostructure film 220 can be employed in accordance with these embodiments.

It should be understood that in some embodiments, raised edges 212 are not removed from tape 110 prior to or during deposition of nanostructure film 220. For example, in some embodiments, nanostructure film 220 can be deployed to an object or material using various urging forces, including magnetic fields or electric fields, as well as other attraction/repulsion techniques to release nanostructure film 220 from backing media 210.

In addition, although nanostructure film 220 is illustrated in FIG. 2 as extending completely between raised edges 212, such an arrangement is not necessary or limiting to the present disclosure. For example, nanostructure film 220 can be arranged on tape 110 in various patterns, including strips, dots or any other desired pattern, and need not contact raised edges 212. Accordingly, nanostructure film 220 is illustrated in FIG. 2 as a unified strip that fully occupies the space between raised edges 212 merely for illustration purposes, and is not to be considered limiting to the present disclosure.

Moreover, although not shown in the figures, nanostructure film 220 can be located on a side of tape 110 that is opposite to a side where raised edges 212 are formed. Alternatively, or in addition, all or portions of tape 110 can be configured to have the different raised edges 212 project from the same or opposite sides of tape 110. Such a configuration preserves the offset or spacing capability of raised edges 212, while permitting flexible deployment of nanostructure film 220.

Figure 3:
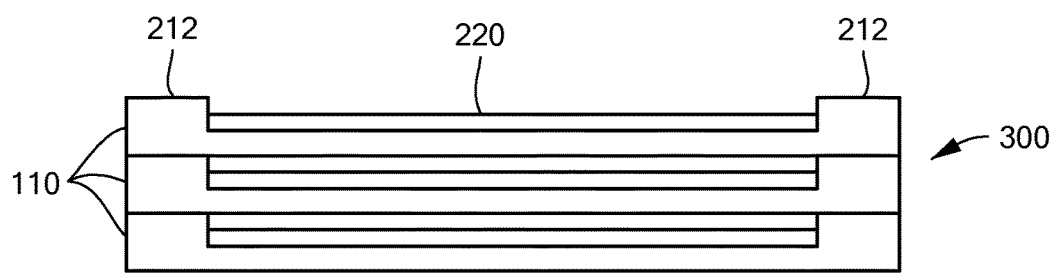
FIG. 3 is a cross-sectional view of a portion of a tape roll showing nanostructure tape sections in a stacked configuration within a tape roll, according to an exemplary embodiment of the present disclosure.

Referring now to FIG. 3, a section 300 of roll 106 (FIG. 1) of tape 110 is illustrated. Section 300 illustrates a cross-section of a portion of roll 106 that shows tape 110 arranged in layers as spooled onto roll 106. As illustrated in section 300, raised edges 212 cooperate with each other in the various layers of tape 110 to off-set nanostructure film 220 from contacting an underside of tape 110. According to this embodiment, nanostructure film 220 is protected from contact, damage or exposure from an underside of tape 110 or other external objects, materials or events. In the case where nanostructure film 220 is composed of carbon nanostructures that are aligned in parallel as a nanostructure forest standing on tape 110, the alignment of the nanostructures and their morphology is preserved from modification that might otherwise occur with contact or impact from other objects or an underside of tape 110. It should be understood that nanostructure film 220 may be located on an underside of tape 110, and be protected from contact or impact with an opposing side of tape 110 and may also be made available for disposition on an object or material without first removing raised edges 212. In addition, or alternatively, a structure to similar to raised edges 212 may be disposed in various locations on tape 110 to act as a stand-off, such as by being located in a central area of tape 110 to provide further support for the tape and otherwise prevent deflection of the tape to avoid contact between the tape and adjacent nanostructure film 220. According to one embodiment of the present disclosure, raised edges 212 may adhere to an underside of tape 110, and be peeled or removed from the current portion of tape 110 on which they are disposed when the tape is unrolled to be exposed to an object or material on which the nanostructure film is to be deposited.

Figure 4:
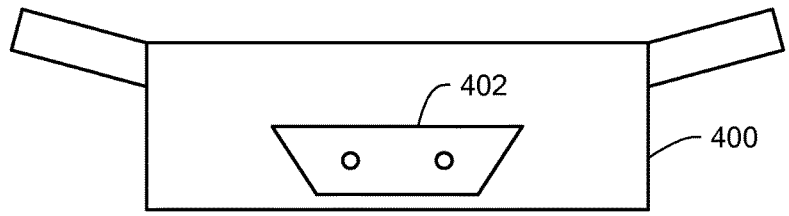
FIG. 4 is an elevation view of a hand held lay-up device incorporating a cassette in accordance with an exemplary embodiment of the present disclosure.

Referring now to FIG. 4, a hand held lay-up device 400 is illustrated. Device 400 can be used to manually lay-up nanostructure films dispensed from cartridge 402 that is deployed in device 400. It should be noted that cartridge 402, like cassette 100 (FIG. 1) can take any suitable shape, including oval, rectangular, trapezoid, or any useful shape that can be accommodated in a lay-up device for deposition of nanostructure films on objects or material. In the embodiment illustrated in FIG. 4, device 400 can be self-contained, and may be battery powered to operate cartridge 402 and its various systems for controlling a nanostructure tape and deposition of a nanostructure film from cartridge 402. As discussed above, cartridge 402 can be self-contained, with an internal power source that can be used to power control systems and actuators or sensors within the cassette to control tape speed, position and tension, or other tape parameters, and also power sensors that can be contained within cartridge 402, including those discussed above. In addition, device 400 or cartridge 402 can house other systems, such as a heat source, vision inspection system, distance sensor or other systems discussed herein that may be employed in controlling the deposition of nanostructure films from cassette 402.

Figure 5:
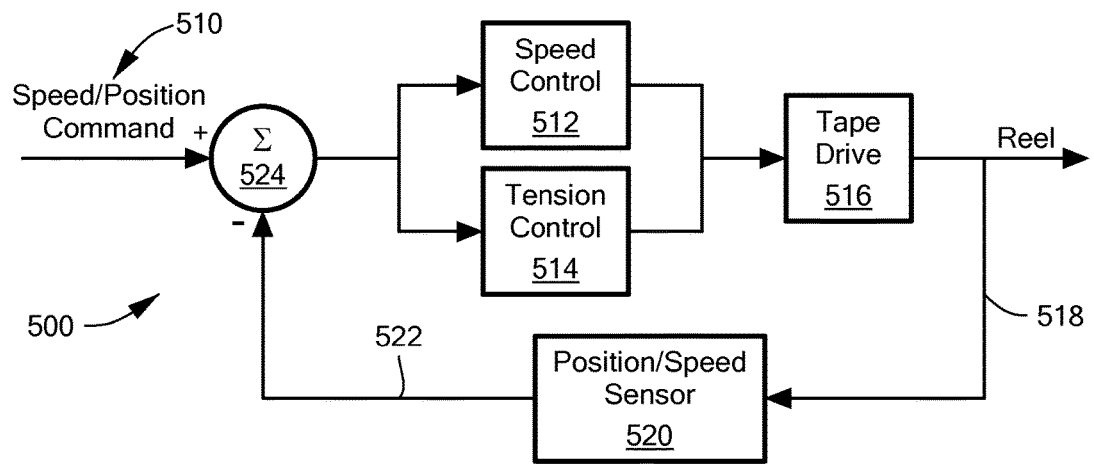
FIG. 5 is a block diagram of a control system for controlling tape speed and/or position in accordance with an exemplary embodiment of the present disclosure.

Referring now to FIG. 5, a diagram of a control system 500 is illustrated for use in an exemplary embodiment of the present disclosure. Control system 500 is provided to control speed or position of a tape in accordance with a speed/position command 510, which may originate from a lay-up machine based on, for example, position or speed of a lay-up machine head incorporating a cassette in accordance with the present disclosure. A speed control 512 and a tension control 514 use the feedback modified command 510 to develop a control signal supplied to a tape drive 516. Tape drive 516 outputs a control to a reel of a cartridge or cassette in accordance with the present disclosure to drive the tape with a desired tension, speed or position, for example. A feedback signal 518 is taken from the output of tape drive 516 and provided to a feedback position/speed sensor 520 to obtain a feedback signal 522 that can be used to obtain a closed loop control for controlling tape speed, position or tension. Feedback signal 522 is supplied to a summation node 524, where it is subtracted from command 510 to obtain a new speed/tension control signal that is supplied to speed control 512 and tension control 514. It should be understood that signal 518 need not be taken from the output of tape drive 516, but can also be derived separately using an independent position/speed sensor that can output signal 518 to position/speed sensor 520 to produce feedback signal 522. It should also be understood that control system 500 can be located, in whole or in part, within a cartridge or cassette in accordance with the present disclosure. Alternatively, or in addition, control system 500 can be located in whole or in part in a lay-up device that employs a cartridge or cassette in accordance with the present disclosure to perform lay-up operations.

Figure 6:
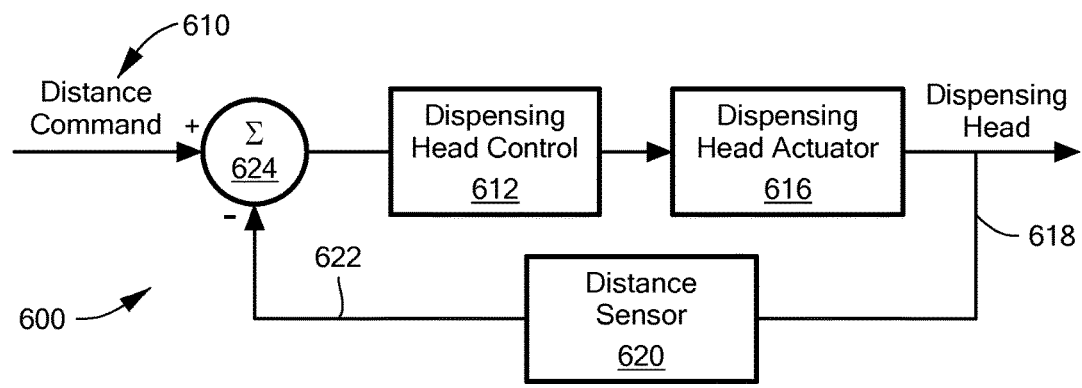
FIG. 6 is a block diagram of a control system for controlling a distance between a nanostructure tape portion and an object or material to which a nanostructure film from the nanostructure tape is to be applied in accordance with an exemplary embodiment of the present disclosure.

Referring now to FIG. 6, a control system 600 for controlling a dispensing head in accordance with the present disclosure is illustrated. Control system 600 accepts a distance command 610, which may originate from a lay-up device, which is applied to a summation node 624 to produce a control signal supplied to a dispensing head control 610. Dispensing head control 612 provides a control configuration for controlling a dispensing head through a dispensing head actuator 616. It should be noted that dispensing head actuator 616 can be located in whole or in part either in a cartridge or cassette according to the present disclosure, or in a lay-up device that employs the cartridge or cassette in accordance with the present disclosure. Dispensing head actuator 616 provides actuation of a dispensing head to adjust a distance and/or pressure between a nanostructure tape and/or nanostructure film and an object or material to which the nanostructure film is to be deposited.

A feedback signal 618 is obtained from the output of dispensing head actuator 616 and supplied to distance sensor 620 for use in developing a feedback signal 622. Feedback signal 622 is provided to summation junction 624 to obtain a closed loop feedback control for controlling the actuation of the dispensing head used to control the distance or pressure of the nanostructure film or nanostructure tape with respect to an object or material upon which the nanostructure film is to be deposited. It should be understood that feedback signal 618 need not be derived from dispensing head actuator 616, but can be provided separately on an independent basis using a distance sensor or pressure sensor. Distance sensors that may be employed to provide feedback signal 618 include a vision inspection system, an optical distance measuring system, which may include a laser distance measurement system, a microscopy distance measuring system, an acoustic distance measuring system, or any other type of distance measuring system. Pressure sensors that may be employed to provide feedback signal 618 include pressure transducers coupled to the dispensing head or dispensing head actuator or disposed between a lay-up device head and a target object or material. In any case, sensors can be provided that provide feedback signal 618 for controlling actuation of the dispensing head.

Typically, control system 600 is intended to be relatively sensitive to permit precise distance or pressure control for the dispensing head, since the nanostructure film may be on the order of 15 microns in height, e.g., measured across its smallest dimension, and may be required to be positioned with respect to an object or material with a tolerance of 1-2 microns. According to some embodiments, control system 600 may be required to control distance or pressure applied by the dispensing head to place the nanostructure film within 5-10 microns of a desired position for deposition of the nanostructure film on the object or material desired. According to another embodiment of the present disclosure, an automated or manual lay-up device may have a physical standoff that is used to supply the desired distance between the dispensing head and the object or material to which the nanostructure film is to be applied. In such an embodiment, the dispensing head position may be fixed or regulated with respect to pressure alone.

Figure 7:
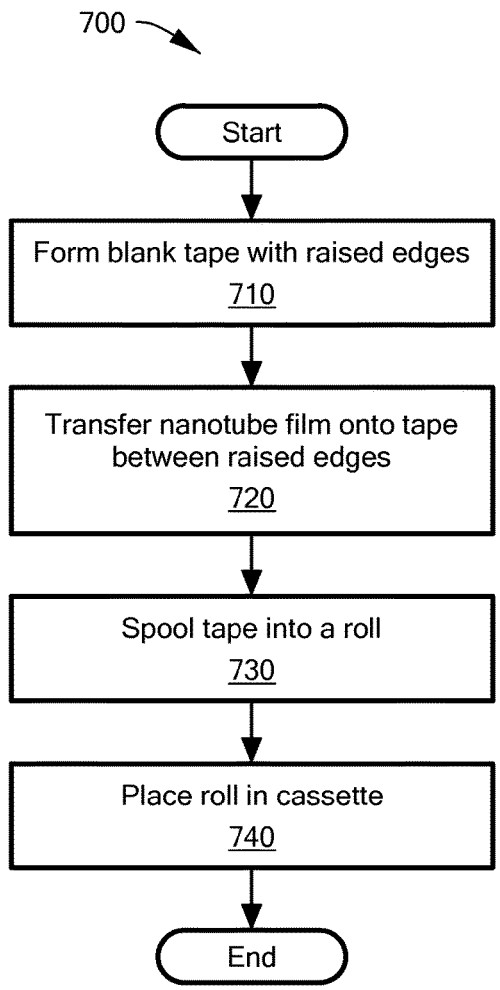
FIG. 7 is a flow chart illustrating a process for manufacturing a cassette in accordance with an exemplary embodiment of the present disclosure.

Referring now to FIG. 7, a flow chart 700 illustrates a process for manufacturing nanostructure tape in accordance with an exemplary embodiment of the present disclosure. The process begins with the formation of tape that is to be used as the flexible substrate for receiving the nanostructure film. The tape may be formed to have raised edges, as is illustrated in block 710. It should be understood that the nanostructure tape can be provided with the nanostructure film, and subsequently provided with raised edges as illustrated in block 710. Block 720 illustrates the transfer of a nanostructure film onto releasable backing media on the tape in a location between where the raised edges are located, or are to be located. Such a location can be on either side of the tape, e.g., without regard to a side on which the raised edges are located.

Once the nanostructure film is disposed on the tape on the backing media, and the raised edges are provided to the tape, the tape can be spooled into a roll, as is illustrated in block 730. By spooling the tape into a roll, the nanostructure film can be compactly stored and protected from damage or exposure. Once the tape is formed into a roll, it can be placed in a cassette, as illustrated in block 740. It should be understood that the cassette into which the roll is placed can have a single reel for supply, so that the tape is withdrawn from the cassette as it is used, and collected externally to the cassette. Alternatively, the roll can be placed in a cassette with a take up reel, so that the used tape is maintained internally to the cassette.

Figure 8:
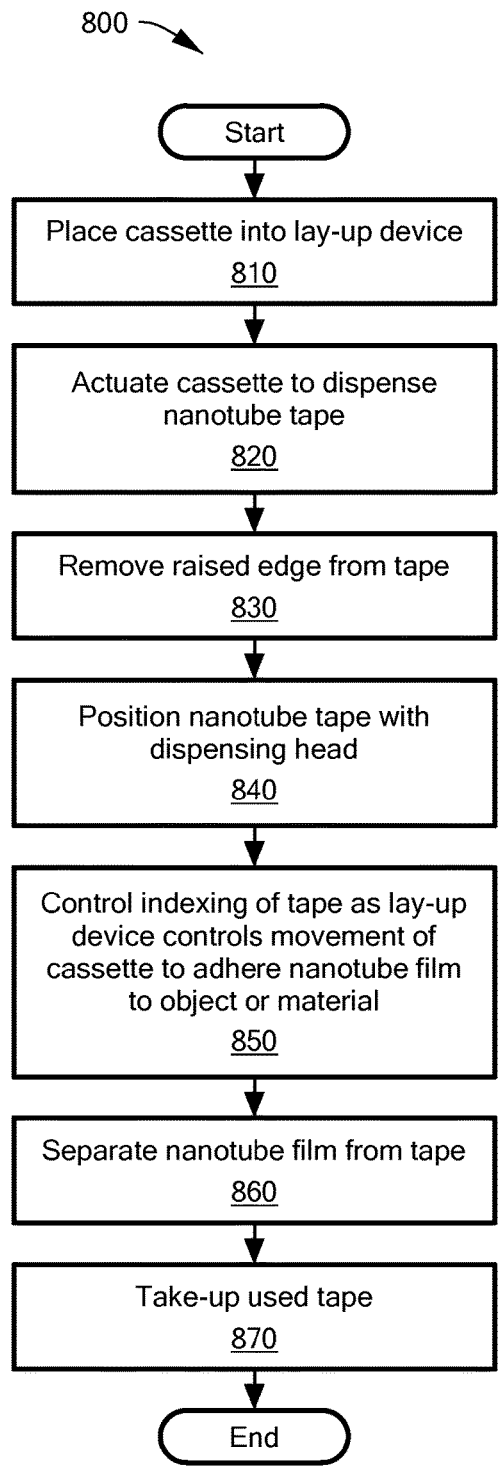
FIG. 8 is a flow chart illustrating a process for utilizing a cassette housing a nanostructure tape to dispense a nanostructure film to an object or material in accordance with an exemplary embodiment of the present disclosure.

Referring now to FIG. 8, a process for depositing a nanostructure film on an object or material is illustrated with flow chart 800. The process begins with the placement of a cassette into a lay-up device, as illustrated in block 810. The lay-up device can be in an automated ATL or AFP machine, or can be a manual device that permits manual lay-up operations. Once the cassette is placed in the device, it is actuated to begin the process of dispensing the nanostructure tape, as illustrated in block 820.

Actuating the cassette can include providing power, communication and/or components used to operate the cassette in the device. For example, the cassette may have an interface for receiving electrical signals that can include command and perimeter communication or electrical power to operate systems within the cassette. In addition, various components can be provided by the device to the cassette, including such items as a tension, speed or position control, a dispensing head and/or dispensing head actuator, tape tensioners, rollers, raised edge removal devices, heat sources, electrical or magnetic field sources and various sensors for control of the cassette components for deposition of the nanostructure film.

According to the embodiment illustrated in FIG. 8, the nanostructure tape is dispensed by first removing the raised edge from the nanostructure tape. According to some embodiments discussed previously, the nanostructure tape may be arranged so that removal of raised edges from the tape need not be carried out to expose the nanostructure film for deposition. Accordingly, the step of removing the raised edges from the nanostructure tape, as illustrated in block 830 of flow chart 800 can be optional. As the nanostructure tape is indexed to permit the nanostructure film to be dispensed, it is positioned with the dispensing head, as illustrated in block 840. The nanostructure tape is then indexed as the lay-up device is moved relative to the object or material to which the nanostructure film is to be deposited. As the lay-up device provides such relative movement, the indexing of the tape is controlled to lay out the nanostructure film in conjunction with the dispensing head as desired to cause the nanostructure film to be deposited on the object or material, such as by adhering to the object or material, as illustrated in block 850. As the nanostructure film is placed in contact with the object or material, it is separated from the tape by being released from the removable backing media, as is illustrated in block 860. The used tape, after the nanostructure film is deposited on the object or material, is taken up on a take-up reel, which may be internal or external to the cassette, in accordance with one or more embodiments of the present disclosure. A step of taking up the used tape is illustrated in block 870 of flow chart 800.

In the configuration where the cassette has a single supply reel, and the used tape is taken up in an external reel, the cassette may be deployed by having a leader section extend from the cassette, which is threaded into the lay-up device that will operate the cassette. According to such an embodiment, the lay-up device can operate to control the speed, position and/or tension of the tape externally to the cassette, as well as provide additional functionality for controlling the operation of the cassette. For example, the cassette can be configured to house the roll of nanostructure tape alone, without the need of an interface or other control system components, so that the cassette is simplified in design, while obtaining the advantages of morphology preservation, storage and transportation, and while providing effective protection from exposure of the nanostructure film to unwanted environments, such as moisture, and avoiding exposure to individuals to reduce or eliminate health or safety concerns.

The present disclosure provides a cartridge apparatus that contains and protects a nanostructure film, which can be a carbon nanotube (CNT) material for direct and convenient use in automated or manual lay-up machines. The nanostructure film, which can include any type of nanostructure composition, including CNTs, is protected from damage and protects a user from exposure to reduce or eliminate real or perceived environmental, health or safety concerns associated with handling nanostructure material.

According to some embodiments, the cartridge can be hand held to be manually used to apply the nanostructure film to an object or material, or it can be installed in an ATL or AFP machine for automated lay-up operations. The cartridge or cassette can accept electronic instructions from the ATL/AFP machinery to perform functions such as advance/rewind tape, dispense tape, start/stop, apply heat, speed up/slow down, move nearer, move farther, and so forth. The cartridge or cassette may have a number of different interfaces, including communications interfaces for exchanging commands or parameters, and power interfaces to receive electrical power. The cassette may also have interfaces for receiving compressed fluid, such as air, or a fluid supply for operating pneumatic equipment. The cassette is also configured to receive various control components, including spindles, dispensing heads, rollers, heat sources, sensors or other devices to contribute to operating the cassette and dispensing the nanostructure film.

According to some embodiments, the object or material to which the nanostructure film is applied has a coating of resin, to which the nanostructure film adheres with greater force than the removable backing media of the tape to permit transfer of the nanostructure film to the object or the material. The cartridge or cassette can be provided with, or used in conjunction with one or more of an adjustable heat source, an adjustable pressure source, an adjustable vacuum source, an adjustable tensioner, as well as a cutting element to cut film or tape or both, to contribute to effectively transferring the nanostructure film to the target object or material.

The nanostructure film can be composed solely of nanostructures of any type, including carbon nanotubes, provided in a particular alignment or orientation, including a vertically aligned parallel forest, a knocked down horizontal alignment or a random orientation. According to some embodiments, the tape may or may not be provided with raised edges. In some embodiments, the raised edges of the tape can help to preserve the alignment of the nanostructures in the nanostructure film, while in other embodiments, such raised edges can potentially be eliminated, such as in the case of some randomly oriented nanostructure films.

The nanostructure film may be comprised of a backing film, resin film and nanostructures, or any combination of those three components. A resin film can be provided that is comprised of commonly used thermoset or thermoplastic material, e.g., Bis-Maleimids (BMI), Epoxy (Epoxide), Phenolic (PF), Polyester (UP), Polyimide, Polyurethane (PUR), Silicone or acrylic, nylon, polybenzimidazole, polypropylene, polystyrene, polyethylene, polyvinyl chloride, PTFE Teflon.

According to some embodiments, the backing film peels away from the nanostructure film, leaving the nanostructures, such as CNTs, aligned and attached to the object or material. The backing film may be comprised of polytetrafluroethylene, polyimide, polyester, polyacrylamide, polyvinyl chloride, polyurethane, a paper, a metal foil, a polymer, a metal film, a paper film, release liner, cellophane, clay-coated Kraft paper, polypropylene, glassine, polyethylene, silicone, or any other variety of polymer, metal, or paper film that is suitable for use as a backing film for removable backing media.

According to some embodiments, the nanostructure film is brought into contact with a target substrate, object or material and the nanostructures, which may include CNTs, are attached to the target object or material while maintaining alignment, such as a parallel alignment standing up from the target object or material. The backing paper is peeled off of the nanostructure film contacting the target object or material and is collected. The target object or material may be composed of a substrate that is a fiber reinforced polymer composite part.

According to some embodiments, the target object or material is heated by a heat source contained in the cassette or the lay-up machinery or elsewhere to control the stickiness or tackiness of the target object or material, which may include a layer or resin that responds to heat to have modified stickiness or tackiness. Alternatively, or in addition, the temperature of the nanostructure tape can be modulated to contribute to releasing the nanostructure film from the tape.

According to some embodiments, the nanostructure film or nanostructure tape may be cut or shaped to result in a particular pattern or geometry deposited on the target object.

The pressure at which the nanostructure film is applied to the target object or material, as well as the distance of the tape from a surface of the target object or material, is controlled in real time to obtain a desired lay-out result for the nanostructure film. For example, a surface of the nanostructure film can represent the tops of nanostructures in a forest of aligned nanostructures, which tops are desired to be adhered to the target object or material, so that upon release from the removable backing media, the nanostructures maintain their vertical alignment in parallel standing on the surface of the object or material. According to one embodiment, the pressure and/or distance is controlled so that the top of the nanostructure forest just touches the target object or material, and is transferred without crushing or knocking over the nanostructures or nanostructure forest.

According to some embodiments, the nanostructures are grown and transferred to the backing media or film to create a nanostructure tape. During such growth and transfer processes, portions of the tape that are damaged or substandard in quality can be marked physically or through other indicia, including electronic indicia, so that those portions of the nanostructure tape can be skipped over during the deposition process, so that a desired level of quality control for placement of the nanostructure film on the target object or material is achieved.

According to some embodiments, a heat source can be provided to the nanostructure tape to contribute to releasing the nanostructure film from the tape. Facilities may also be provided to the cassette or machinery in which the cassette is deployed to manage floating particles, such as by collecting free or loose nanostructure material, which can be achieved with components such as vacuum nozzles and/or air knives.

The systems and methods of the present disclosure obtain a number of advantages for handling nanostructure films and their use in lay-up operations. For example, the disclosed cassettes or cartridges permit ease of transport, storage and shipping of nanostructure materials, including carbon nanotube forests. The controlled formation of nanostructure tape, and the regulated dispensing of the same, permits repeatable and controlled deposition of nanostructure material, including carbon nanotube forests, to objects or material while maintaining alignment of the nanostructures. The presently disclosed cartridges and/or cassettes can be sealed to protect the nanostructure material, and to avoid exposing the operator to nanostructure material. The nanostructure material housed in a cartridge permits the rapid and easy provisioning of nanostructure film to automatic tape laying machinery with the installation of the cartridge. The sealed cartridge can also protect the nanostructure material from external influences, including moisture. The cartridge housing a nanostructure film on a flexible substrate, such as a tape, provides an intermediary device by which nanostructure films taken from a growth substrate can be preserved, stored, transported and subsequently applied to a target object or material in common composite fabrication processes, for example to greatly simplify and improve the composite manufacture process using nanostructure material.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can employ a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also embody computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. Some of the procedures, processes and/or modules described herein may be implemented in hardware, software, embodied as a computer-readable medium having program instructions, firmware, or a combination thereof. For example, the functions described herein may be performed by a processor executing program instructions out of a memory or other storage device. Therefore, it is the object of the appended claims to cover all such variations and modifications as come within the true spirit and scope of the disclosure.

What is claimed is:

1. A nanostructure material management system, comprising:
   a portable housing with an opening communicating between an internal and an external region of the housing;
   a roll of flexible substrate including a nanostructure film on at least one side of the flexible substrate, the roll being positioned within the housing to permit rotational movement of the roll; and
   the roll being arranged and configured to permit the flexible substrate to be unrolled from the roll and, while maintaining the unrolled flexible substrate in the housing, present the at least one side to the opening to expose the nanostructure film to the external region to permit transfer of at least a portion of the nanostructure film to a target object that is external to the housing.

2. The system according to claim 1, wherein the housing forms at least a portion of a cassette for use in a lay-up operation that dispenses the nanostructure film.

3. The system according to claim 1, further comprising a sealing member located at the opening to close the opening and thereby seal the internal region of the housing.

4. The system according to claim 1, further comprising a dispersing head located in opposition to the opening for displacing the flexible substrate with respect to the opening.

5. The system according to claim 1, further comprising at least one strip projecting from the surface of the flexible substrate to space the flexible substrate from adjacent portions in a roll configuration.

6. The system according to claim 5, further comprising at least two strips on the surface of the flexible substrate to space the flexible substrate from adjacent portions in the roll configuration, the at least two strips being located at opposing edges of the flexible substrate.

7. The system according to claim 6, wherein one or more strips can be modified to reduce an amount that the one or more strips projects from the flexible substrate.

8. The system according to claim 7, wherein the one or more strips are removable from the surface of the flexible substrate.

9. The system according to claim 1, further comprising a releasable backing media interposed between the flexible substrate and the nanostructure film.

10. The system according to claim 9, wherein the releasable backing media is composed of one or more of polytetrafluroethylene, polyimide, polyester, polyacrylamide, polyvinyl chloride, polyurethane, a paper, a metal foil, a polymer, a metal film, a paper film, release liner, cellophane, clay-coated Kraft paper, polypropylene, glassine, polyethylene or silicone.

11. The system according to claim 1, further comprising a drive coupled to the flexible substrate for indexing the flexible substrate by the opening.

12. The system according to claim 1, further comprising a sensor for detecting phenomena related to disposition of the nanostructure film to the target item.

13. The system according to claim 1, further comprising an actuator that is operative to apply one or more of a displacement, a pressure, a tension, a speed, a position or a temperature to the flexible substrate.

14. The system according to claim 13, wherein the actuator is operative to apply one or more of a displacement or pressure to the flexible substrate to cause the nanostructure film to project through the opening and contact the target item.

15. The system according to claim 1, further comprising:
   aligned nanostructures in the nanostructure film; and
   an alignment of the aligned nanostructures being maintained when the at least portion of the nanostructure material is transferred to the target object.

16. A method for transferring nanostructure material to a target object, comprising:
   providing a nanostructure film to at least one side of a flexible substrate;
   spooling the flexible substrate into a roll;
   housing the roll in a portable container that permits the roll to rotate; and
   unrolling the roll while maintaining the unrolled flexible substrate in the housing; and
   passing the unrolled flexible substrate to present the at least one side of the flexible substrate to an opening in the housing to make the nanostructure film accessible to an outside of the housing to permit transfer of at least a portion of the nanostructure film from the flexible substrate to the target object located on the outside of the housing.

17. The method according to claim 16, further comprising loading the housing into a lay-up machine that is operative to permit the flexible substrate to index by the opening and deposit the nanostructure film to the target item.

18. The method according to claim 16, further comprising covering the opening to seal the housing.

19. The method according to claim 16, further comprising actuating an actuator to apply one or more of a displacement, a pressure, a tension, a speed, a position or a temperature to the flexible substrate.

20. The method according to claim 16, further comprising arranging at least one strip to project from the surface of the flexible substrate to space the flexible substrate from adjacent portions in the roll.

21. The method according to claim 16, further comprising interposing a releasable backing media between the flexible substrate and the nanostructure film.

22. The method according to claim 21, wherein the releasable backing media is composed of one or more of polytetrafluroethylene, polyimide, polyester, polyacrylamide, polyvinyl chloride, polyurethane, a paper, a metal foil, a polymer, a metal film, a paper film, release liner, cellophane, clay-coated Kraft paper, polypropylene, glassine, polyethylene or silicone.

23. The method according to claim 16, further comprising sensing phenomena related to disposition of the nanostructure film to the target item.

24. The method according to claim 16, further comprising:
   providing aligned nanostructures in the nanostructure film; and
   maintaining an alignment of the aligned nanostructures when the at least portion of the nanostructure film is transferred to the target object.

25. A portable nanostructure material management system, comprising a roll of tape enclosed in a portable cartridge suitable for use in a lay-up machine, the tape including a nanostructure film on at least one side, the at least one side being accessible to an exterior of the cartridge while the tape is maintained in the cartridge to permit transfer of the nanostructure film to an external target object.

26. The system according to claim 25, further comprising:
 aligned nanostructures in the nanostructure film; and
 an alignment of the aligned nanostructures being maintained when the at least portion of the nanostructure material is transferred to the target object.

27. A nanostructure material management system, comprising:
 a portable housing with an opening communicating between an internal and an external region of the housing;
 a roll of flexible substrate including a nanostructure film with aligned nanostructures on at least one side of the flexible substrate, the roll being positioned within the housing to permit rotational movement of the roll; and
 the roll being arranged and configured to permit the flexible substrate to be unrolled from the roll and, while maintaining the unrolled flexible substrate in the housing, present the at least one side to the opening to expose the nanostructure film to the external region to permit transfer of at least a portion of the nanostructure film to a target object that is external to the housing, with an alignment of the aligned nanostructures being maintained with the transfer.

28. A method for transferring nanostructure material to a target object, comprising:
 providing a nanostructure film with aligned nanostructures to at least one side of a flexible substrate;
 spooling the flexible substrate into a roll;
 housing the roll in a portable container that permits the roll to rotate; and
 unrolling the roll while maintaining the unrolled flexible substrate in the housing to present the at least one side of the flexible substrate to an opening in the housing to make the nanostructure film accessible to an outside of the housing to permit transfer of at least a portion of the nanostructure film from the flexible substrate to the target object located on the outside of the housing while maintaining an alignment of the aligned nanostructures.

* * * * *